(12) United States Patent
Ou et al.

(10) Patent No.: US 10,070,377 B2
(45) Date of Patent: Sep. 4, 2018

(54) METHOD, SYSTEM AND APPARATUS FOR AUTOMATICALLY CONNECTING TO WLAN

(71) Applicant: TENCENT TECHNOLOGY (SHENZHEN) COMPANY LIMITED, Shenzhen (CN)

(72) Inventors: Xiaodong Ou, Shenzhen (CN); Jiubiao Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 54 days.

(21) Appl. No.: 15/269,815

(22) Filed: Sep. 19, 2016

(65) Prior Publication Data
US 2017/0013549 A1    Jan. 12, 2017

Related U.S. Application Data

(63) Continuation of application No. PCT/CN2015/082657, filed on Jun. 29, 2015.

(30) Foreign Application Priority Data

Jun. 30, 2014  (CN) .......................... 2014 1 0306703

(51) Int. Cl.
*H04W 48/16* (2009.01)
*H04W 76/10* (2018.01)
(Continued)

(52) U.S. Cl.
CPC ........... *H04W 48/16* (2013.01); *H04W 12/08* (2013.01); *H04W 76/02* (2013.01); *H04W 76/10* (2018.02); *H04W 48/14* (2013.01); *H04W 84/12* (2013.01)

(58) Field of Classification Search
CPC ..... H04W 48/16; H04W 76/10; H04W 12/08; H04W 76/02; H04W 48/14; H04W 84/12
See application file for complete search history.

(56) References Cited

U.S. PATENT DOCUMENTS 7,039,021 B1     5/2006  Kokudo
2002/0196764 A1* 12/2002  Shimizu .............. H04L 63/0823
                                                370/338
(Continued)

FOREIGN PATENT DOCUMENTS

CN    101534531 A    9/2009
CN    102149153 A    8/2011
(Continued)

OTHER PUBLICATIONS

Supplementary European Search Report in European application No. 15814196.0, dated Jun. 14, 2017.
(Continued)

*Primary Examiner* — Ajay Cattungal
(74) *Attorney, Agent, or Firm* — Oppedahl Patent Law Firm LLC

(57) ABSTRACT

Disclosed is a method for automatically connecting to a wireless local area network (WLAN), including: automatically detecting, by a terminal, whether a wireless signal of the WLAN exists; sending, by the terminal, a safety verification information acquisition request to a wireless device corresponding to the WLAN when the wireless signal of the WLAN is detected and when the information of the WLAN matches information of a prestored WLAN, the acquisition request including application server information; acquiring, by the wireless device, safety verification information corresponding to the WLAN from an application server corresponding to the acquisition request, and sending the safety verification information to the terminal; and performing, by the terminal, safety verification on the WLAN according to the safety verification information, and accessing a network after the safety verification is passed.

17 Claims, 12 Drawing Sheets

(51) Int. Cl.
*H04W 12/08* (2009.01)
*H04W 76/02* (2009.01)
*H04W 48/14* (2009.01)
*H04W 84/12* (2009.01)

(56) References Cited

U.S. PATENT DOCUMENTS

| | | | | |
|---|---|---|---|---|
| 2008/0129497 | A1* | 6/2008 | Woodard | G08B 25/08 340/540 |
| 2011/0047603 | A1* | 2/2011 | Gordon | H04L 63/06 726/5 |
| 2012/0076045 | A1* | 3/2012 | Pease | H04W 48/16 370/254 |
| 2012/0127980 | A1* | 5/2012 | Quinn | H04W 8/005 370/338 |
| 2013/0176897 | A1* | 7/2013 | Wang | H04W 12/06 370/254 |
| 2013/0244723 | A1* | 9/2013 | Yerrabommanahalli | H04W 48/16 455/552.1 |
| 2014/0192724 | A1* | 7/2014 | Turunen | H04W 74/0808 370/329 |
| 2014/0302786 | A1* | 10/2014 | Kasslin | H04W 8/005 455/41.2 |
| 2014/0302787 | A1* | 10/2014 | Rantala | H04W 4/008 455/41.2 |
| 2014/0321317 | A1* | 10/2014 | Kasslin | H04W 4/08 370/254 |
| 2015/0036540 | A1* | 2/2015 | Kasslin | H04W 48/18 370/254 |
| 2015/0200811 | A1* | 7/2015 | Kasslin | H04L 41/12 370/254 |
| 2017/0196011 | A1* | 7/2017 | Pease | H04W 72/0453 |

FOREIGN PATENT DOCUMENTS

| | | |
|---|---|---|
| CN | 102202301 A | 9/2011 |
| CN | 102421202 A | 4/2012 |
| CN | 103024929 A | 4/2013 |
| CN | 103298072 A | 9/2013 |
| CN | 103684548 A | 3/2014 |
| CN | 103813474 A | 5/2014 |
| CN | 104349423 A | 2/2015 |
| WO | 2012159414 A1 | 11/2012 |

OTHER PUBLICATIONS

Notification to Grant Patent Right for Invention of Chinese application No. 201410306703.7, dated Sep. 22, 2015.
International Search Report in international application No. PCT/CN2015/082657, dated Oct. 10, 2015.
English Translation of the Written Opinion of the International Search Authority in international application No. PCT/CN2015/082657, dated Oct. 10, 2015.
Notification of the First Office Action of Chinese application No. 201410306703. 7, dated Aug. 7, 2015.

* cited by examiner

METHOD, SYSTEM AND APPARATUS FOR AUTOMATICALLY CONNECTING TO WLAN

CROSS-REFERENCE TO RELATED APPLICATIONS

This is a continuation application of International Patent Application No. PCT/CN2015/082657, filed on Jun. 29, 2015, which claims the priority benefit of Chinese Patent Application No. 201410306703.7, filed on Jun. 30, 2014, the content of which is incorporated by reference herein in its entirety for all purposes.

FIELD OF THE TECHNOLOGY

The present disclosure relates to the field of communications technologies, and in particular, to a method, system and apparatus for automatically connecting to a wireless local area network (WLAN).

BACKGROUND OF THE DISCLOSURE

With development of wireless network technologies, mobile communications terminals have gradually become main network information terminals due to their portability, and a large number of users have access to the Internet to acquire information through the mobile communications terminals. At present, there are mainly two manners in which the mobile communications terminals access the Internet, one is accessing the Internet through mobile communications data networks (e.g., GPRS or 3G wireless communications networks) provided by mobile communications operators, and the other is accessing the Internet through WLANs (e.g., Wi-Fi access points).

Wireless Fidelity (Wi-Fi) is a general term for technologies supporting local area wireless network communications under IEEE802.11 protocols. A Wi-Fi access point can connect a terminal device to a local area network (LAN) connecting to the Internet, to enable the terminal device connected with a wireless access point to access the Internet. Access to the Internet by connecting a Wi-Fi access point has a fast speed, a low cost and other advantages.

In the existing technology, most wireless hotspots are located in places for public access, for example, airports, cafes, hotels, bookstores, campuses and the like. When a mobile communications terminal connects a Wi-Fi access point, a user is required to first open a Wi-Fi switch, when a signal of the Wi-Fi access point is searched, it is necessary to input a password corresponding the searched Wi-Fi access point, and when the user does not know the password of the Wi-Fi access point, it is necessary to enquire the password of the Wi-Fi access point. Such a connection manner has a low degree of automation and a complicated operation process.

SUMMARY

Embodiments of the present invention propose a method for automatically connecting to a WLAN, the method for automatically connecting to a WLAN including:

automatically detecting, by a terminal, whether a wireless signal of the WLAN exists when receiving a WLAN connection request triggered by a user;

comparing, by the terminal, information of the WLAN corresponding to the wireless signal with information of a pre-stored WLAN when detecting the wireless signal of the WLAN, safety verification information of the pre-stored WLAN being correspondingly stored in an application server;

sending, by the terminal, a safety verification information acquisition request to a wireless device corresponding to the WLAN when the information of the WLAN matches the information of the pre-stored WLAN, the safety verification information acquisition request including application server information;

acquiring, by the wireless device, safety verification information corresponding to the WLAN from an application server corresponding to the safety verification information acquisition request when receiving the safety verification information acquisition request, and sending the safety verification information to the terminal; and performing, by the terminal, safety verification on the WLAN according to the safety verification information, and accessing a network after the safety verification is passed.

The embodiments of the present invention propose a method for automatically connecting to a WLAN, the method for automatically connecting to a WLAN including:

automatically detecting whether a wireless signal of the WLAN exists when receiving a WLAN connection request triggered by a user;

comparing information of the WLAN corresponding to the wireless signal with information of a pre-stored WLAN when detecting the wireless signal of the WLAN, safety verification information of the pre-stored WLAN being correspondingly stored in an application server;

when the information of the WLAN matches the information of the pre-stored WLAN, acquiring safety verification information corresponding to the WLAN from the application server through a wireless device corresponding to the WLAN; and performing safety verification on the WLAN according to the safety verification information, and accessing a network after the safety verification is passed.

The present disclosure further proposes a system for automatically connecting to a WLAN, the system for automatically connecting to a WLAN including: a wireless device and a terminal, and the terminal including a first detection module, a first processing module, a receiving-sending module and a first verification module, the first detection module being configured to automatically detect whether a wireless signal of the WLAN exists when receiving a WLAN connection request triggered by a user;

the first processing module being configured to compare information of the WLAN corresponding to the wireless signal with information of a pre-stored WLAN when detecting the wireless signal of the WLAN, safety verification information of the pre-stored WLAN being correspondingly stored in an application server;

the receiving-sending module being configured to send a safety verification information acquisition request to a wireless device corresponding to the WLAN when the information of the WLAN matches the information of the pre-stored WLAN, the safety verification information acquisition request including application server information;

the wireless device being configured to acquire safety verification information corresponding to the WLAN from an application server corresponding to the safety verification information acquisition request when receiving the safety verification information acquisition request, and send the safety verification information to the terminal; and the first verification module being configured to perform safety verification on the WLAN according to the safety verification information, and access a network after the safety verification is passed.

Implementation of the objectives of the present disclosure, function characteristics and advantages thereof are further described below with reference to the accompanying drawings.

DESCRIPTION OF EMBODIMENTS

It should be understood that specific embodiments described herein are merely used for interpreting the present disclosure, instead of limiting the present disclosure.

In order to facilitate description about the technical solution of the present disclosure, in the following embodiments, the WLAN is described by taking Wi-Fi hotspots as an example. A person skilled in the art may clearly understand that the following embodiments are merely preferred implementation solutions of the present disclosure, which are not merely limited to the following solution that describes Wi-Fi hotspots. The solution may also be completely applied to other WLAN environments.

Figure 1:
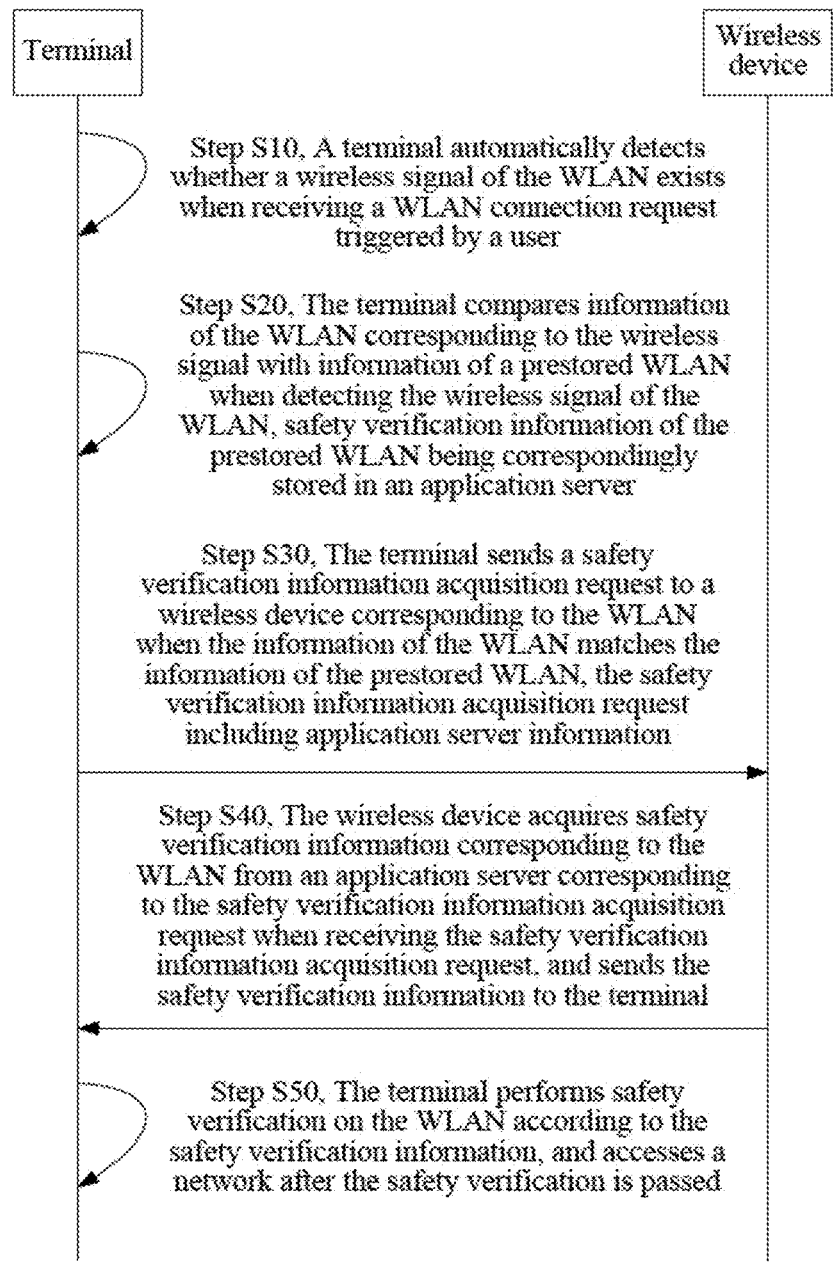
FIG. 1 is a flowchart of a first embodiment of a method for automatically connecting to a WLAN according to the present disclosure.

The present disclosure proposes a method for automatically connecting to a WLAN. As shown in FIG. 1, FIG. 1 is a flowchart of a first embodiment of a method for automatically connecting to a WLAN according to the present disclosure. The method for automatically connecting to a WLAN includes the following steps.

Step S10. A terminal automatically detects whether a wireless signal of the WLAN exists when receiving a WLAN connection request triggered by a user.

When a user exchanges information with the outside, the exchange can be completed only if a network is opened. For example, when the user wants to chat with the family, he/she needs to chat with the family through a chat application (e.g., QQ, WeChat or the like) in the event that there is a network. The network may be a wired network or a wireless network, and the wireless network includes wireless networks provided by mobile communications operators or WLANs provided by Wi-Fi hotspots. The Wi-Fi hotspots may be Wi-Fi hotspots created through wireless routers, or may be Wi-Fi hotspots created through wireless devices having wireless network cards such as notebooks or Ipads. When the user wants to exchange information with the outside based on a wireless network, the user triggers access to an application by clicking an icon of the application loaded to the terminal, or triggers access to an application by opening an interface of a program running in the background and clicking an icon of the application running in the background, and triggers a Wi-Fi hotspot connection request while access to the application is triggered, and may also trigger the Wi-Fi hotspot connection request through a virtual key set in an interactive interface of the application; similarly, the Wi-Fi hotspot connection request may also be triggered according to other feasible manners. In this embodiment, the Wi-Fi hotspot connection request is preferably triggered through an application. The application may be a mobile phone manager, a QQ manager or the like.

When it is necessary to connect to a WLAN provided by a Wi-Fi hotspot, a terminal user opens a Wi-Fi switch, to open a Wi-Fi function, and when receiving a Wi-Fi hotspot connection request triggered by the user, a terminal automatically detects whether a Wi-Fi signal exists.

Step S20. The terminal compares information of the WLAN corresponding to the wireless signal with information of a pre-stored WLAN when detecting the wireless signal of the WLAN, safety verification information of the pre-stored WLAN being correspondingly stored in an application server.

Information of a Wi-Fi hotspot is pre-stored in the terminal, and safety verification information of the pre-stored Wi-Fi hotspot is correspondingly stored in an application server. The information of the pre-stored Wi-Fi hotspot may be stored in a form of a list, and the safety verification information of the pre-stored Wi-Fi hotspot may be correspondingly stored on an application server of an application. The information of the pre-stored Wi-Fi hotspot includes, but is not limited to, Wi-Fi hotspot information of safety verification information stored on the application server, and the information of the WLAN includes, but is not limited to, an SSID of the Wi-Fi hotspot, an IP address of the Wi-Fi hotspot, a Mac address of the Wi-Fi hotspot and/or the position of the Wi-Fi hotspot and the like. When detecting the Wi-Fi signal, the terminal compares the information of the Wi-Fi hotspot corresponding to the Wi-Fi signal with the information of the pre-stored Wi-Fi hotspot. For example, an SSID corresponding to the Wi-Fi signal is acquired, and the SSID is compared with a pre-stored SSID; for another example, a Mac address corresponding to the Wi-Fi signal is acquired, and the Mac address is compared with a pre-stored Mac address.

Step S30. The terminal sends a safety verification information acquisition request to a wireless device corresponding to the WLAN when the information of the WLAN matches the information of the pre-stored WLAN, the safety verification information acquisition request including application server information.

When the information of the Wi-Fi hotspot matches the information of the pre-stored Wi-Fi hotspot, for example, when the SSID of the Wi-Fi hotspot is identical with the SSID of the pre-stored Wi-Fi hotspot, or when the Mac address of the Wi-Fi hotspot is identical with the Mac address of the pre-stored Wi-Fi hotspot, the terminal judges that the information of the Wi-Fi hotspot matches the information of the pre-stored Wi-Fi hotspot, that is, safety verification information of the Wi-Fi hotspot is stored in the application server, the terminal sends a safety verification information acquisition request to a wireless device corresponding to the wireless signal, the safety verification information acquisition request including application server information, for example, the request may include ID of the application server and other information. When the information of the Wi-Fi hotspot does not match the information of the pre-stored Wi-Fi hotspot, the terminal prompts the user that automatic connection to the Wi-Fi hotspot fails. By judging whether the detected information of the Wi-Fi hotspot matches the information of the pre-stored Wi-Fi hotspot, the terminal sends a safety verification information acquisition request to a wireless device corresponding to the Wi-Fi hotspot only when they match each other, which effectively prevents the terminal from still sending a safety verification information acquisition request to the wireless device when there is no safety verification information, further reduces procedures of connection to the WLAN, and improves efficiency and accuracy of connection to the WLAN.

Step S40. The wireless device acquires safety verification information corresponding to the WLAN from an application server corresponding to the safety verification information acquisition request when receiving the safety verification information acquisition request, and sends the safety verification information to the terminal.

When receiving the safety verification information acquisition request, the wireless device determines an application server corresponding to the safety verification information acquisition request, and the determination can be made according to an application server ID included in the safety verification information acquisition request. For example, when it is determined that an application triggering a request for automatically connecting to a WLAN included in the safety verification information acquisition request is a terminal manager, it is determined that an application server corresponding to the safety verification information acquisition request is a terminal manager application server. The wireless device acquires safety verification information corresponding to the WLAN from the application server corresponding to the safety verification information acquisition request, for example, acquires the safety verification information from the terminal manager application server. The wireless device, when receiving the safety verification information sent by the application server, sends the safety verification information to the terminal. The safety verification information may be encrypted passwords. It may be understood that the safety verification information may be transmitted in a manner of a ciphertext, so as to improve security of transmission of the safety verification information.

In another embodiment of the present invention, the process of acquiring safety verification information may also be as follows: the terminal sends the safety verification information acquisition request to a wireless device corresponding to the wireless Wi-Fi hotspot, and the wireless device creates a communication connection between the terminal and the application server, that is, the wireless device forwards the safety verification information acquisition request to the application server when receiving the safety verification information acquisition request, the safety verification information acquisition request including information of the Wi-Fi hotspot. When receiving the safety verification information acquisition request, the application server acquires the information of the Wi-Fi hotspot, the application server acquires safety verification information corresponding to the Wi-Fi hotspot according to a mapping relationship between Wi-Fi hotspots and safety verification information, and sends the safety verification information to the wireless device, and the wireless device returns response information based on the acquisition request, the response information including the safety verification information. When receiving the response information returned by the wireless device based on the safety verification information, the terminal acquires the safety verification information in the response information.

Step S50. The terminal performs safety verification on the WLAN according to the safety verification information, and accesses a network after the safety verification is passed.

After acquiring the safety verification information from the application server through the wireless device, the terminal performs safety verification on the Wi-Fi hotspot according to the safety verification information, and accesses a network after the safety verification is passed. The process of performing safety verification on the Wi-Fi hotspot according to the safety verification information may be as follows: decrypt the safety verification information to obtain the decrypted safety verification information, and automatically fill the decrypted safety verification information in a safety verification interface provided by the Wi-Fi hotspot, to perform safety verification on the Wi-Fi hotspot. After the terminal passes the safety verification, the wireless device corresponding to the Wi-Fi hotspot authorizes the terminal to access a network. After the terminal accesses the network, the user of the terminal can exchange information with the outside through the network.

It may be understood that, after the safety verification on the Wi-Fi hotspot is passed, the terminal maps and stores the safety verification information and the Wi-Fi hotspot, to allow the terminal to pass the safety verification on the Wi-Fi hotspot directly through the stored safety verification information when searching the Wi-Fi hotspot next time. In another embodiment of the present invention, in order to save storage space of the terminal, when the safety verification information and the Wi-Fi hotspot are mapped and stored, timing begins, within preset time (7 days, 15 days or a month, etc.), if the user does not acquire that the stored safety verification information passes safety verification, the safety verification information is deleted; within the preset time, if the terminal acquires that the stored safety verification information passes safety verification, the safety verification information is reserved. That is to say, when the number of times the terminal acquires the stored safety verification information does not exceed a threshold (twice, three times, etc.), the stored safety verification information is deleted; when the number of times the terminal acquires the stored safety verification information exceeds the threshold, the safety verification information is reserved.

It may be understood that, in order to further save the process of connecting to a Wi-Fi hotspot and improve efficiency of connecting to a Wi-Fi hotspot, when a Wi-Fi signal of the Wi-Fi hotspot is detected, when information of the Wi-Fi hotspot matches information of a pre-stored Wi-Fi hotspot, and when information of only one Wi-Fi hotspot matches the information of the pre-stored Wi-Fi hotspot, whether safety verification information of the Wi-Fi hotspot is stored is judged, when the safety verification information of the Wi-Fi hotspot is stored, safety verification is performed on the Wi-Fi hotspot directly through the stored safety verification information, and a network is accessed after the safety verification is passed. When Wi-Fi signals of a plurality of Wi-Fi hotspots are detected, whether safety verification information is stored in the plurality of Wi-Fi hotspots is judged, when there is a Wi-Fi hotspot storing the safety verification information, safety verification is performed on the Wi-Fi hotspot directly through the stored safety verification information, and a network is accessed after the safety verification is passed; alternatively, when safety verification information of a plurality of matched Wi-Fi hotspots stored exists, the safety verification information is displayed in a form of a list, when response information sent based on the list is received, information of the Wi-Fi hotspots in the response information is acquired, safety verification information of the Wi-Fi hotspots in the response information is determined, safety verification is performed on the Wi-Fi hotspots through the determined safety verification information, and the Internet is accessed after the safety verification is passed; alternatively, one Wi-Fi hotspot is determined in accordance with a preset rule (Wi-Fi signal strength, a distance from the Wi-Fi hotspot to the current position of the user, etc.), and safety verification is passed through safety verification information of the determined Wi-Fi hotspot. When a Wi-Fi signal of the Wi-Fi hotspot is detected, whether safety verification has been performed on the Wi-Fi hotspot is judged, when the safety verification has been performed on the Wi-Fi hotspot, the safety verification on the Wi-Fi hotspot is passed directly through safety verification information of the Wi-Fi hotspot stored, which saves the process of connecting to the Wi-Fi hotspot and improves efficiency of connecting to the Wi-Fi hotspot.

According to the embodiment of the present invention, a terminal automatically detects a wireless signal of a WLAN, and the terminal sends an acquisition request to a wireless device corresponding to the wireless signal, acquires safety verification information of the WLAN corresponding to the wireless signal from an application server corresponding to the safety verification information acquisition request through the wireless device, performs safety verification on the WLAN according to the safety verification information, and accesses a network after the safety verification is passed, which achieves automatic connection to the WLAN, achieves automation of a WLAN connection manner, reduces the operation process, and improves efficiency of connecting to the WLAN.

Figure 2:
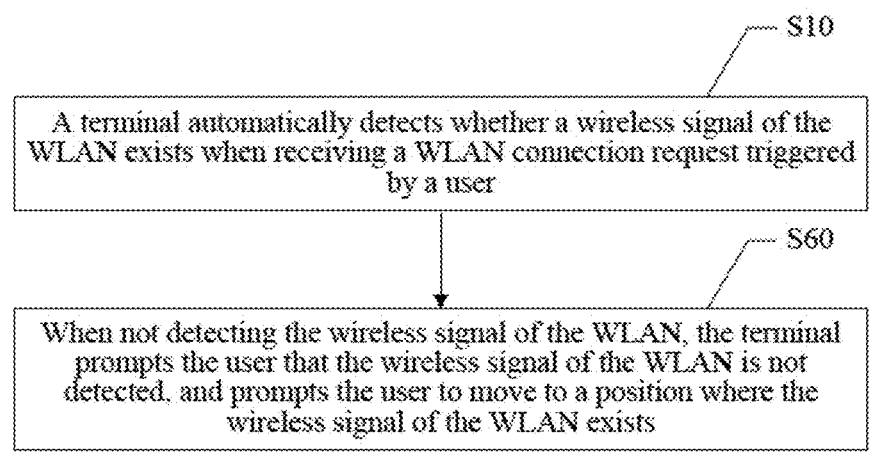
FIG. 2 is a flowchart of a second embodiment of the method for automatically connecting to a WLAN according to the present disclosure.

Further, based on the first embodiment of the method for automatically connecting to a WLAN, a second embodiment of the method for automatically connecting to a WLAN according to the present disclosure is proposed. As shown in FIG. 2, after step S10, the method further includes:

Step S60. When not detecting the wireless signal of the WLAN, prompting, by the terminal, the user that the wireless signal of the WLAN is not detected, and prompting the user to move to a position where the wireless signal of the WLAN exists.

When a Wi-Fi signal is not detected, the terminal prompts the user that the Wi-Fi signal is not detected, and prompts the user to move to a position where the Wi-Fi signal exists, so as to detect the Wi-Fi signal. The manner in which the terminal prompts the user may be a text, an image or a sound or the like. Specifically, the process of prompting the user to move to a position where the Wi-Fi signal exists is as follows: information of Wi-Fi hotspots pre-stored by the terminal includes positions of respective pre-stored Wi-Fi hotspots, and the terminal first acquires the current position of the user, determines a position of a Wi-Fi hotspot closest to the current position from the positions of the pre-stored Wi-Fi hotspots, and prompts the user to move to the determined position, so as to detect the Wi-Fi signal. When not detecting the wireless signal of the WLAN, the terminal prompts the user that the wireless signal of the WLAN is not detected, and prompts the user to move to a position where the wireless signal of the WLAN exists, so as to timely find the position where the wireless signal of the WLAN exists and timely access a network, thereby improving efficiency of connecting to the WLAN.

Figure 3:
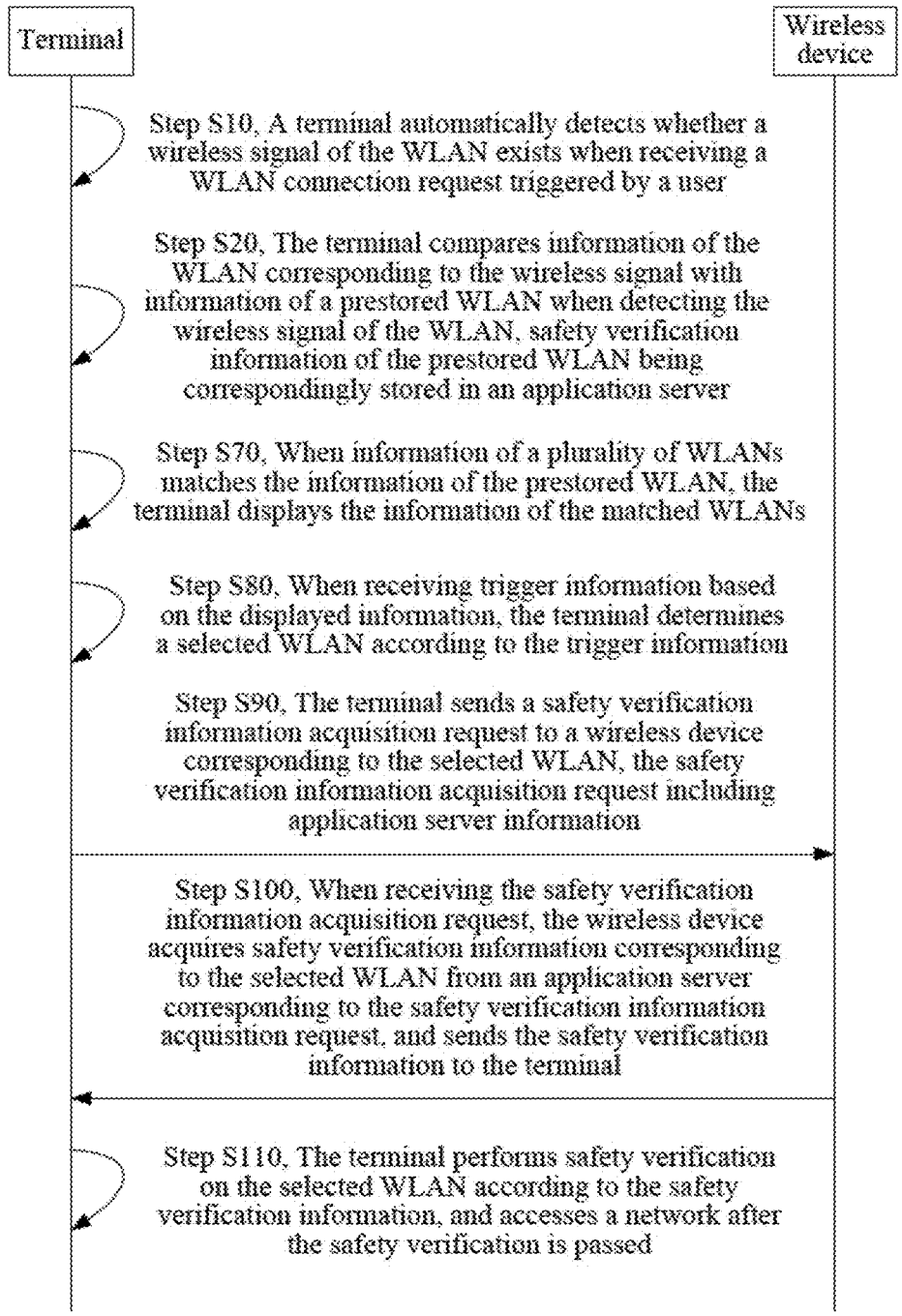
FIG. 3 is a flowchart of a third embodiment of the method for automatically connecting to a WLAN according to the present disclosure.

Further, based on the second embodiment of the method for automatically connecting to a WLAN, a third embodiment of the method for automatically connecting to a WLAN according to the present disclosure is proposed. As shown in FIG. 3, after step S20, the method further includes:

Step S70. When information of a plurality of WLANs matches the information of the pre-stored WLAN, displaying, by the terminal, the information of the matched WLANs;

Step S80. When receiving trigger information based on the displayed information, determining, by the terminal, a selected WLAN according to the trigger information;

Step S90. Sending, by the terminal, a safety verification information acquisition request to a wireless device corresponding to the selected WLAN, the safety verification information acquisition request including application server information;

Step S100. When receiving the safety verification information acquisition request, acquiring, by the wireless device, safety verification information corresponding to the selected WLAN from an application server corresponding to the safety verification information acquisition request, and sending the safety verification information to the terminal; and Step S110. Performing, by the terminal, safety verification on the selected WLAN according to the safety verification information, and accessing a network after the safety verification is passed.

When information of a plurality of Wi-Fi hotspots matches information of a pre-stored hotspot, the terminal displays the information of the plurality of WLANs matched. Specifically, the terminal constructs the information of the matched Wi-Fi hotspots into a list, and displays the information of the matched Wi-Fi hotspots in a form of a list. The list includes, but is not limited to, one or more of SSIDs of the Wi-Fi hotspots, Mac addresses of the Wi-Fi hotspots and IP addresses of the Wi-Fi hotspots. For example, referring to Table 1, Table 1 is a list of the information of the matched Wi-Fi hotspots, including SSIDs of the Wi-Fi hotspots. It may be understood that, in order to enable the user to timely see the list, the terminal, after displaying the list, prompts the user to check the list. The prompting manner may be sound, video or the like. For example, a section of voice "please select one Wi-Fi hotspot for access from the displayed list" is produced.

The user may perform a trigger response on the list by clicking an SSID in the list, when the user clicks the SSID in the list, trigger information is sent, the terminal, when receiving the trigger information based on the displayed information, determines the selected Wi-Fi hotspot according to the trigger information, the terminal sends a safety verification information acquisition request to a wireless device corresponding to the selected wireless signal, the wireless device, when receiving the safety verification information acquisition request, acquires safety verification information corresponding to the WLAN from an application server corresponding to the safety verification information acquisition request and sends the safety verification information to the terminal, and the terminal performs safety verification on the Wi-Fi hotspot according to the safety verification information, and accesses a network after the safety verification is passed. For example, when the user clicks the SSID "MacDonald", the Wi-Fi hotspot included in the trigger information is a Wi-Fi hotspot whose SSID is selected as "MacDonald", and it is determined that the user chooses to connect the Wi-Fi hotspot of "MacDonald". The terminal acquires safety verification information corresponding to the Wi-Fi hotspot whose SSID is "MacDonald" from the application server through the wireless device, and the safety verification information is an encrypted password. The terminal decrypts the acquired safety verification information, and automatically enters the decrypted safety verification information in the safety verification interface, so as to perform safety verification on the Wi-Fi hotspot whose SSID is "MacDonald", and the terminal accesses the network after the safety verification is passed. When information of one WLAN matches the information of the pre-stored WLAN, step S10, step S20, step S30, step S40 and step S50 in FIG. 1 are performed in sequence; when information of a plurality of WLANs matches the information of the pre-stored WLAN, step S10, step S20, step S70, step S80, step S90, step S100 and step S110 in FIG. 2 are performed in sequence.

TABLE 1

| SSID |
|---|
| MacDonald |
| KFC |
| Starbucks |

According to the embodiment of the present invention, the terminal, when information of a plurality of WLANs matches the information of the pre-stored WLAN, displays the information of the matched WLANs, so as to timely acquire corresponding safety verification information from an application server through a wireless device according to trigger information based on the displayed information, performs safety verification on the WLAN according to the safety verification information, and accesses a network after the safety verification is passed, thereby improving efficiency of connecting to the WLAN.

Figure 4:
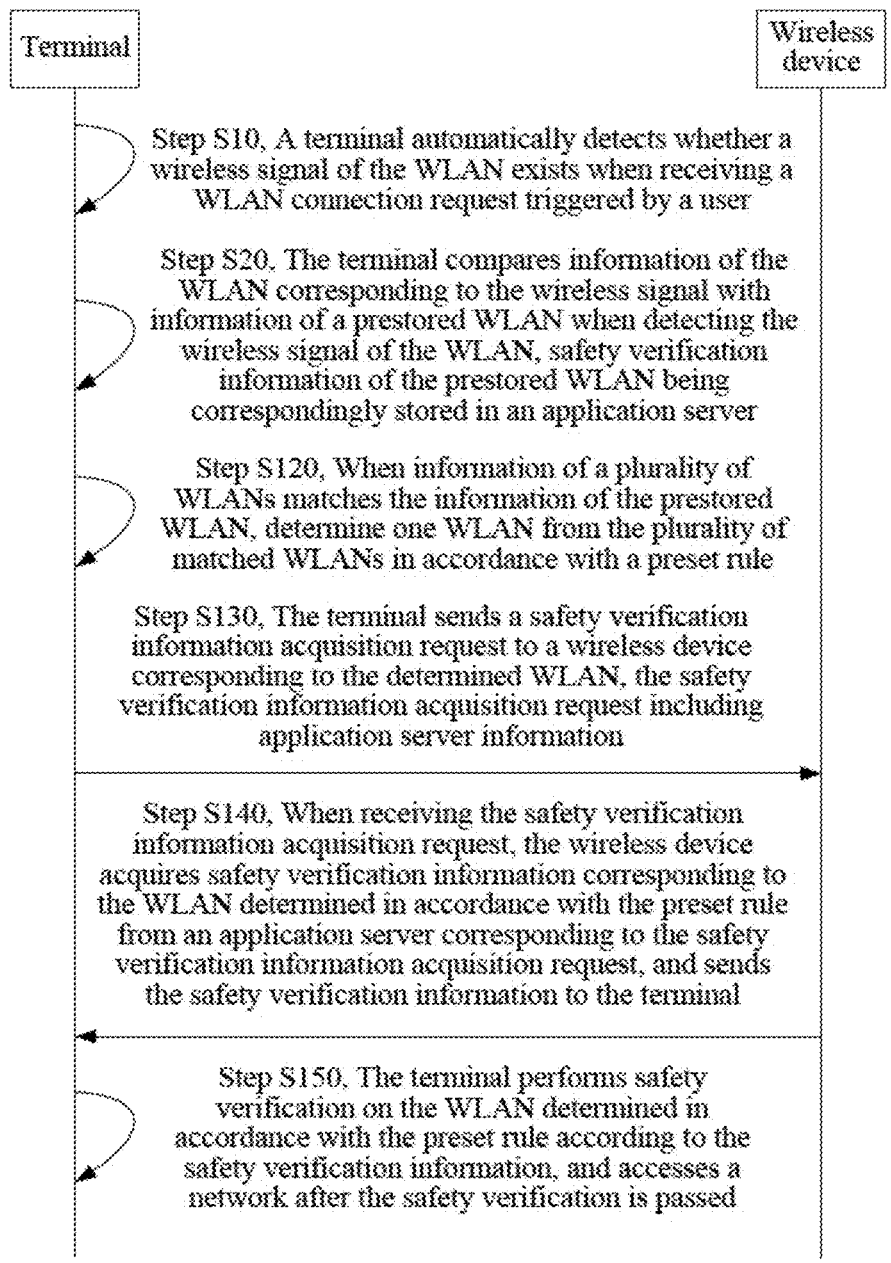
FIG. 4 is a flowchart of a fourth embodiment of the method for automatically connecting to a WLAN according to the present disclosure.

Further, based on the third embodiment of the method for automatically connecting to a WLAN, a fourth embodiment of the method for automatically connecting to a WLAN according to the present disclosure is proposed. As shown in FIG. 4, after step S20, the method further includes:

Step S120. When information of a plurality of WLANs matches the information of the pre-stored WLAN, determining one WLAN from the plurality of matched WLANs in accordance with a preset rule;

Step S130. Sending, by the terminal, a safety verification information acquisition request to a wireless device corresponding to the determined WLAN, the safety verification information acquisition request including application server information;

Step S140. When receiving the safety verification information acquisition request, acquiring, by the wireless device, safety verification information corresponding to the WLAN determined in accordance with the preset rule from an application server corresponding to the safety verification information acquisition request, and sending the safety verification information to the terminal; and Step S150. Performing, by the terminal, safety verification on the WLAN determined in accordance with the preset rule according to the safety verification information, and accessing a network after the safety verification is passed.

When information of a plurality of Wi-Fi hotspots matches information of a pre-stored Wi-Fi hotspot, the terminal determines one Wi-Fi hotspot from the plurality of Wi-Fi hotspots matched in accordance with a preset rule. For example, the preset rule may be strength of a Wi-Fi signal, and the terminal acquires signal strength of all matched Wi-Fi hotspots, and determines one Wi-Fi hotspot with the highest signal strength from all the matched Wi-Fi hotspots as the determined Wi-Fi hotspot. If there are four matched Wi-Fi hotspots, i.e., A, B, C and D, and the corresponding signal strength is one bar, two bars, three bars and four bars, in the four Wi-Fi hotspots, the one with the highest signal strength is the hotspot D, and the hotspot D is used as the determined Wi-Fi hotspot. For another example, the preset rule may be the distance from the Wi-Fi hotspot to the current position, and the terminal acquires the current position of the user, that is, acquires the current position of the user (the terminal) through a positioning apparatus or a positioning system on the terminal, positions of all the matched Wi-Fi hotspots are acquired, and distances between the user and respective matched Wi-Fi hotspots are calculated according to the current position and the acquired positions. The Wi-Fi hotspot with the shortest distance is determined as the determined Wi-Fi hotspot. If there are four matched hotspots, i.e., a, b, c and d and corresponding distances from the user are 3 m, 5 m, 6 m and 8 m, in the four Wi-Fi hotspots, the Wi-Fi hotspot with the shortest distance from the user is the hotspot a, and the hotspot a is used as the determined Wi-Fi hotspot. The terminal, after determining the Wi-Fi hotspot, sends a safety verification information acquisition request to a wireless device corresponding to the determined Wi-Fi hotspot, and the wireless device, when receiving the safety verification information acquisition request, acquires safety verification information corresponding to the WLAN determined according to the preset rule from an application server corresponding to the safety verification information acquisition request, and sends the safety verification information to the terminal; the terminal performs safety verification on the WLAN determined in accordance with the preset rule according to the safety verification information, and accesses a network after the safety verification is passed. When information of one WLAN matches the information of the pre-stored WLAN, step S10, step S20, step S30, step S40 and step S50 in FIG. 1 are performed in sequence; when information of a plurality of WLANs matches the information of the pre-stored WLAN, step S10, step S20, step S120, step S130, step S140 and step S150 in FIG. 5 are performed in sequence.

According to the embodiment of the present invention, the terminal, when information of a plurality of WLANs matches the information of the pre-stored WLAN, automatically determines one WLAN from the plurality of matched WLANs in accordance with a preset rule, timely acquires safety verification information corresponding to the WLAN determined in accordance with the preset rule from an application server through a wireless device, performs safety verification on the WLAN determined in accordance with the preset rule according to the safety verification information, and accesses a network after the safety verification is passed, thereby achieving an auto-selection on access to the WLAN and effectively improving efficiency of connecting to the WLAN.

Figure 5:
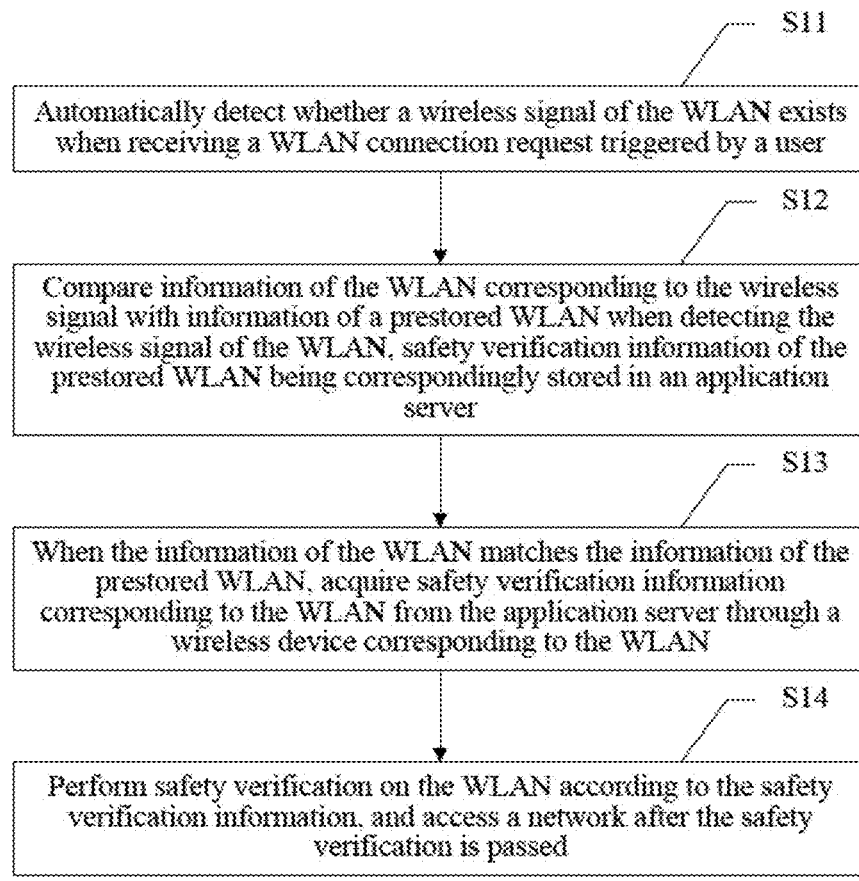
FIG. 5 is a flowchart of a fifth embodiment of the method for automatically connecting to a WLAN according to the present disclosure.

As shown in FIG. 5, FIG. 5 is a flowchart of a fifth embodiment of the method for automatically connecting to a WLAN according to the present disclosure. The method for automatically connecting to a WLAN in this embodiment includes the following steps:

Step S11. Automatically detect whether a wireless signal of the WLAN exists when receiving a WLAN connection request triggered by a user.

When a user exchanges information with the outside, the exchange can be completed only if a network is opened. For example, when the user wants to chat with the family, he/she needs to chat with the family through a chat application (e.g., QQ, WeChat or the like) in the event that there is a network. The network may be a wired network or a wireless network, and the wireless network includes wireless networks provided by mobile communications operators or WLANs provided by Wi-Fi hotspots. The Wi-Fi hotspots may be Wi-Fi hotspots created through wireless routers, or may be Wi-Fi hotspots created through wireless devices having wireless network cards such as notebooks or Ipads. When the user wants to exchange information with the outside based on a wireless network, the user triggers access to an application by clicking an icon of the application loaded to the terminal, or triggers access to an application by opening an interface of a program running in the background and clicking an icon of the application running in the background, and triggers a Wi-Fi hotspot connection request while access to the application is triggered, and may also trigger the Wi-Fi hotspot connection request through a virtual key set in an interactive interface of the application; similarly, the Wi-Fi hotspot connection request may also be triggered according to other feasible manners. In this embodiment, the Wi-Fi hotspot connection request is preferably triggered through an application. The application may be a mobile phone manager, a QQ manager or the like.

When it is necessary to connect to a WLAN provided by a Wi-Fi hotspot, a terminal user opens a Wi-Fi switch, to open a Wi-Fi function, and when receiving a Wi-Fi hotspot connection request triggered by the user, a terminal automatically detects whether a Wi-Fi signal exists.

Step S12. Compare information of the WLAN corresponding to the wireless signal with information of a pre-stored WLAN when detecting the wireless signal of the WLAN, safety verification information of the pre-stored WLAN being correspondingly stored in an application server.

Information of a Wi-Fi hotspot is pre-stored, and safety verification information of the pre-stored Wi-Fi hotspot is correspondingly stored. The information of the pre-stored Wi-Fi hotspot may be stored in a form of a list, and the safety verification information of the pre-stored Wi-Fi hotspot may be correspondingly stored on an application server of an application platform. The information of the pre-stored Wi-Fi hotspot includes, but is not limited to, an SSID of the Wi-Fi hotspot, an IP address of the Wi-Fi hotspot, a Mac address of the Wi-Fi hotspot and/or the position of the Wi-Fi hotspot and the like. When the Wi-Fi signal is detected, the information of the Wi-Fi hotspot corresponding to the Wi-Fi signal is compared with the information of the pre-stored Wi-Fi hotspot. For example, an SSID corresponding to the Wi-Fi signal is acquired, and the SSID is compared with a pre-stored SSID; for another example, a Mac address corresponding to the Wi-Fi signal is acquired, and the Mac address is compared with a pre-stored Mac address.

Step S13. When the information of the WLAN matches the information of the pre-stored WLAN, acquire safety verification information corresponding to the WLAN from the application server through a wireless device corresponding to the WLAN.

When the information of the Wi-Fi hotspot matches the information of the pre-stored Wi-Fi hotspot, for example, when the SSID of the Wi-Fi hotspot is identical with the SSID of the pre-stored Wi-Fi hotspot, or when the Mac address of the Wi-Fi hotspot is identical with the Mac address of the pre-stored Wi-Fi hotspot, it is judged that the information of the Wi-Fi hotspot matches the information of the pre-stored Wi-Fi hotspot. Safety verification information corresponding to the Wi-Fi hotspot is acquired from an application server through a wireless device corresponding to the matched Wi-Fi hotspot. The application server is an application server corresponding to the application, for example, an application server of a QQ manager, an application server of a mobile phone manager or the like. The process of acquiring the safety verification information from the application server through the wireless device corresponding to the matched Wi-Fi hotspot is as follows: when the information of the Wi-Fi hotspot matches the information of the pre-stored Wi-Fi hotspot, send the safety verification information acquisition request to a wireless device corresponding to the wireless Wi-Fi hotspot, the safety verification information acquisition request including information of the Wi-Fi hotspot and application server information, for example, the request may include ID of the application server and other information. The wireless device creates a communication connection between the terminal and the application server, that is, the wireless device forwards the safety verification information acquisition request to the application server corresponding to the safety verification information acquisition request when receiving the safety verification information acquisition request. The application server, when receiving the safety verification information acquisition request, acquires the information of the Wi-Fi hotspot, the application server acquires safety verification information corresponding to the Wi-Fi hotspot according to a mapping relationship between Wi-Fi hotspots and safety verification information, and sends the safety verification information to the wireless device, and the wireless device returns response information based on the safety verification information acquisition request, the response information including the safety verification information. When the response information returned by the wireless device based on the safety verification information acquisition request is received, the safety verification information in the response information is acquired. The safety verification information may be encrypted passwords. It may be understood that the safety verification information may be transmitted in a manner of a ciphertext, so as to improve security of transmission of the safety verification information.

Step S14. Perform safety verification on the WLAN according to the safety verification information, and access a network after the safety verification is passed.

After acquiring the safety verification information from the application server through the wireless device, safety verification is performed on the Wi-Fi hotspot according to the safety verification information, and a network is accessed after the safety verification is passed. The process of performing safety verification on the Wi-Fi hotspot according to the safety verification information may be as follows: decrypt the safety verification information to obtain the decrypted safety verification information, and automatically fill the decrypted safety verification information in a safety verification interface of the Wi-Fi hotspot, to perform safety verification on the Wi-Fi hotspot. After the mobile terminal passes the safety verification, the wireless device corresponding to the Wi-Fi hotspot authorizes the mobile terminal to access a network. After the mobile terminal accesses the network, the mobile terminal can exchange information with the outside through the network.

It may be understood that, after the safety verification on the Wi-Fi hotspot is passed, the safety verification information and the Wi-Fi hotspot are mapped and stored, to cause the safety verification on the Wi-Fi hotspot to be passed directly through the stored safety verification information when the Wi-Fi hotspot is searched next time. In another embodiment of the present invention, in order to save storage space, when the safety verification information and the Wi-Fi hotspot are mapped and stored, timing begins, within preset time (7 days, 15 days or a month, etc.), if the user does not acquire that the stored safety verification information passes safety verification, the safety verification information is deleted; within the preset time, if the user acquires that the stored safety verification information passes safety verification, the safety verification information is reserved. That is to say, when the number of times the user acquires the stored safety verification information does not exceed a threshold (twice, three times, etc.), the stored safety verification information is deleted; when the number of times the user acquires the stored safety verification information exceeds the threshold, the safety verification information is reserved.

It may be understood that, in order to further save the process of connecting to a Wi-Fi hotspot and improve efficiency of connecting to a Wi-Fi hotspot, when information of the Wi-Fi hotspot matches information of a pre-stored Wi-Fi hotspot, and when information of only one Wi-Fi hotspot matches the information of the pre-stored Wi-Fi hotspot, whether safety verification information of the Wi-Fi hotspot is stored is judged, when the safety verification information of the Wi-Fi hotspot is stored, safety verification is performed on the Wi-Fi hotspot directly through the stored safety verification information, and a network is accessed after the safety verification is passed. When information of a plurality of Wi-Fi hotspots matches the information of the pre-stored Wi-Fi hotspot, whether safety verification information is stored in the plurality of Wi-Fi hotspots is judged, when there is a Wi-Fi hotspot storing the safety verification information, safety verification is performed on the Wi-Fi hotspot directly through the stored safety verification information, and a network is accessed after the safety verification is passed; alternatively, when safety verification information of a plurality of matched Wi-Fi hotspots stored exists, the safety verification information is displayed in a form of a list, when the user sends response information based on the list, information of the Wi-Fi hotspots in the response information is acquired, safety verification information of the Wi-Fi hotspots in the response information is determined, safety verification is performed on the Wi-Fi hotspots through the determined safety verification information, and the Internet is accessed after the safety verification is passed; alternatively, one Wi-Fi hotspot is determined in accordance with a preset rule (Wi-Fi signal strength, a distance from the Wi-Fi hotspot to the current position of the user, etc.), and safety verification is passed through safety verification information of the determined Wi-Fi hotspot. When information of the Wi-Fi hotspot matches the information of the pre-stored Wi-Fi hotspot, whether safety verification has been performed on the Wi-Fi hotspot is judged, when the safety verification has been performed on the Wi-Fi hotspot, the safety verification on the Wi-Fi hotspot is passed directly through safety verification information of the Wi-Fi hotspot stored, which saves the process of connecting to the Wi-Fi hotspot and improves efficiency of connecting to the Wi-Fi hotspot.

The embodiment of the present invention, by automatically detecting a wireless signal of a WLAN, acquiring safety verification information of the WLAN matching the information of the pre-stored WLAN from an application server through a wireless device corresponding to the matched WLAN, performing safety verification on the WLAN according to the safety verification information, and accessing a network after the safety verification is passed, achieves automatic connection to the WLAN, achieves automation of a WLAN connection manner, reduces the operation process, and improves efficiency of connecting to the WLAN.

Figure 6:
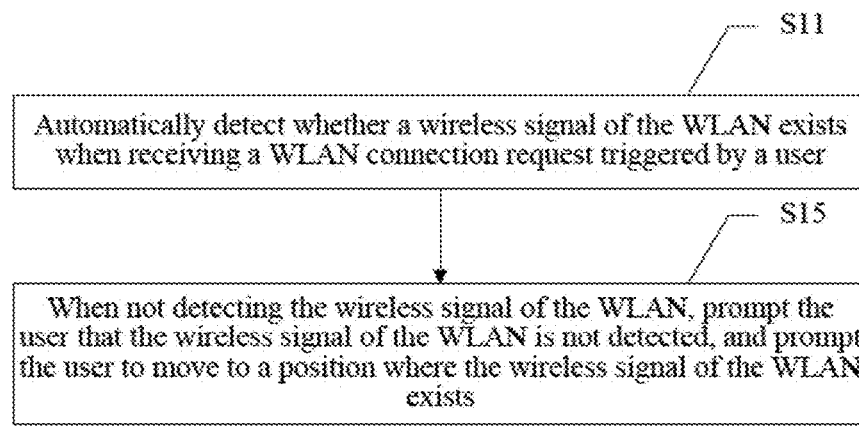
FIG. 6 is a flowchart of a sixth embodiment of the method for automatically connecting to a WLAN according to the present disclosure.

Further, based on the fifth embodiment, a sixth embodiment of the method for automatically connecting to a WLAN according to the present disclosure is proposed. As shown in FIG. 6, after step S11, the method further includes:

Step S15. When not detecting the wireless signal of the WLAN, prompting the user that the wireless signal of the WLAN is not detected, and prompting the user to move to a position where the wireless signal of the WLAN exists.

When a Wi-Fi signal is not detected, the user is prompted that the Wi-Fi signal is not detected, and the user is prompted to move to a position where the Wi-Fi signal exists, so as to detect the Wi-Fi signal. The manner in which the user is prompted may be a text, an image or a sound or the like. Specifically, the process of prompting the user to move to a position where the Wi-Fi signal exists is as follows: information of pre-stored Wi-Fi hotspots includes positions of respective pre-stored Wi-Fi hotspots, the current position of the user is acquired at first, the position of the Wi-Fi hotspot closest to the current position is determined from the positions of the pre-stored Wi-Fi hotspots, and the user is prompted to move to the determined position, so as to detect the Wi-Fi signal. When the wireless signal of the WLAN is not detected, the user is prompted that the wireless signal of the WLAN is not detected, and the user is prompted to move to a position where the wireless signal of the WLAN exists, so as to timely find the position where the wireless signal of the WLAN exists and timely access the Internet, thereby improving efficiency of connecting to the WLAN.

Figure 7:
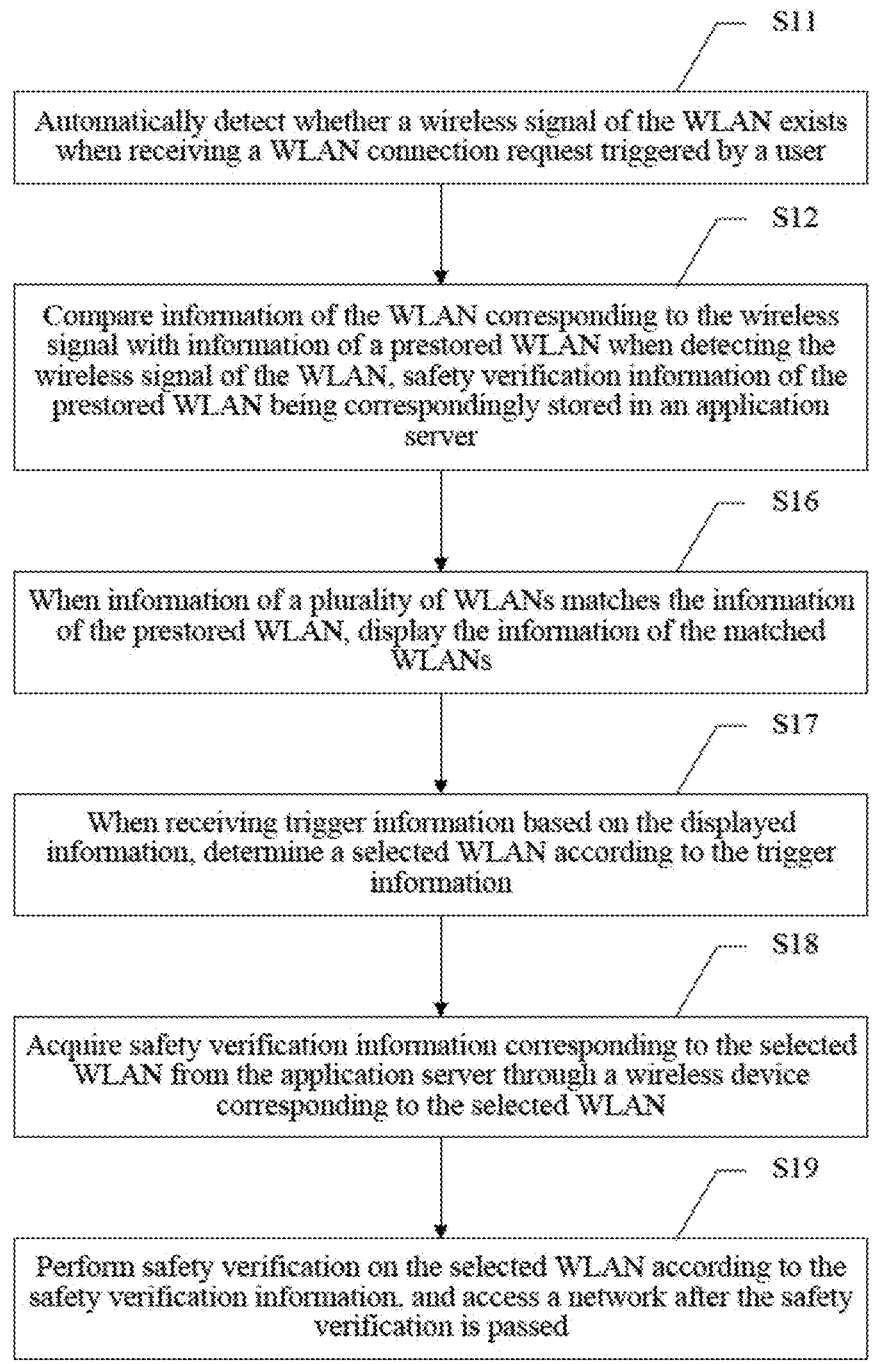
FIG. 7 is a flowchart of a seventh embodiment of the method for automatically connecting to a WLAN according to the present disclosure.

Further, based on the fifth embodiment, a seventh embodiment of the method for automatically connecting to a WLAN according to the present disclosure is proposed. As shown in FIG. 7, after step S12, the method further includes:

Step S16. When information of a plurality of WLANs matches the information of the pre-stored WLAN, displaying the information of the matched WLANs;

Step S17. When receiving trigger information based on the displayed information, determining a selected WLAN according to the trigger information;

Step S18. Acquiring safety verification information corresponding to the selected WLAN from the application server through a wireless device corresponding to the selected WLAN; and Step S19. Performing safety verification on the selected WLAN according to the safety verification information, and accessing a network after the safety verification is passed.

When information of a plurality of Wi-Fi hotspots matches information of a pre-stored hotspot, the information of the matched Wi-Fi hotspots is constructed into a list, and the information of the matched Wi-Fi hotspots is displayed. The information of the matched Wi-Fi hotspots may be displayed in a form of a list. The list includes, but is not limited to, one or more of SSIDs of the Wi-Fi hotspots, Mac addresses of the Wi-Fi hotspots and IP addresses of the Wi-Fi hotspots. For example, referring to Table 1, Table 1 is a list of the information of the matched Wi-Fi hotspots, including SSIDs of the Wi-Fi hotspots. It may be understood that, in order to enable the user to timely see the list, the mobile terminal, after displaying the list, prompts the user to check the list. The prompting manner may be sound, video or the like. For example, a section of voice "please select one Wi-Fi hotspot for access from the displayed list" is produced.

The user may perform a trigger response on the list by clicking an SSID in the list, when the user clicks the SSID in the list, trigger information is sent, when the trigger information based on the displayed information is received, the selected Wi-Fi hotspot is determined according to the trigger information, safety verification information corresponding to the selected Wi-Fi hotspot is acquired from an application server through a wireless device corresponding the selected Wi-Fi hotspot, safety verification is performed on the Wi-Fi hotspot according to the safety verification information, and a network is accessed after the safety verification is passed. For example, when the user clicks the SSID "MacDonald", the Wi-Fi hotspot included in the trigger information is a Wi-Fi hotspot whose SSID is selected as "MacDonald", and it is determined that the user chooses to connect the Wi-Fi hotspot of "MacDonald". Safety verification information corresponding to the Wi-Fi hotspot whose SSID is "MacDonald" is acquired from the application server through the wireless device of the Wi-Fi hotspot whose SSID is "MacDonald", and the safety verification information is an encrypted password. The acquired safety verification information is decrypted, and the decrypted safety verification information is automatically entered in the safety verification interface, so as to perform safety verification on the Wi-Fi hotspot whose SSID is "MacDonald", and the network is accessed after the safety verification is passed. When information of one WLAN matches the information of the pre-stored WLAN, step S11, step S12, step S13 and step S14 in FIG. 5 are performed in sequence; when information of a plurality of WLANs matches the information of the pre-stored WLAN, step S11, step S12, step S16, step S17, step S18 and step S19 in FIG. 7 are performed in sequence.

According to the embodiment of the present invention, when information of a plurality of WLANs matches the information of the pre-stored WLAN, the information of the matched WLANs is displayed, so as to timely acquire safety verification information of a selected WLAN from an application server through a wireless device of the selected WLAN according to trigger information based on the displayed information, safety verification is performed on the WLAN according to the safety verification information, and a network is accessed after the safety verification is passed, thereby improving efficiency of connecting to the WLAN.

Figure 8:
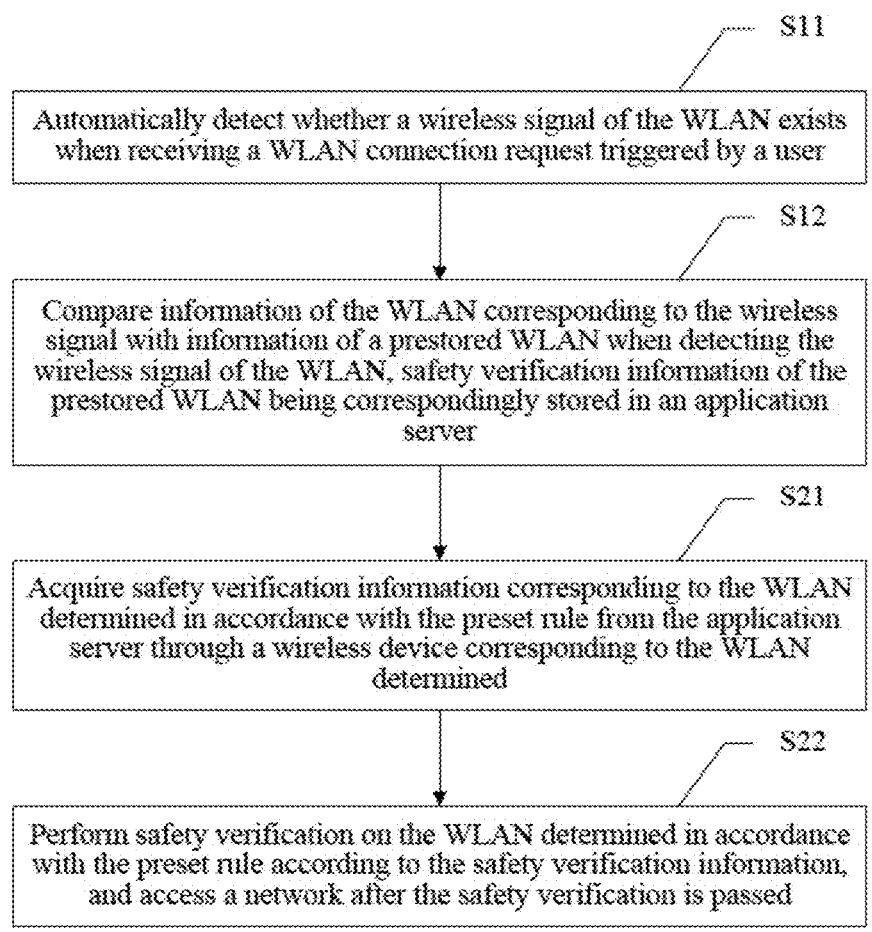
FIG. 8 is a flowchart of an eighth embodiment of the method for automatically connecting to a WLAN according to the present disclosure.

Further, based on the fifth embodiment, an eighth embodiment of the method for automatically connecting to a WLAN according to the present disclosure is proposed. As shown in FIG. 8, after step S12, the method further includes:

Step S101. When information of a plurality of WLANs matches the information of the pre-stored WLAN, determining one WLAN from the plurality of matched WLANs in accordance with a preset rule;

Step S102. Acquiring safety verification information corresponding to the WLAN determined in accordance with the preset rule from the application server through a wireless device corresponding to the WLAN determined; and Step S103. Performing safety verification on the WLAN determined in accordance with the preset rule according to the safety verification information, and accessing a network after the safety verification is passed.

When information of a plurality of Wi-Fi hotspots matches information of a pre-stored Wi-Fi hotspot, one Wi-Fi hotspot is determined from the plurality of Wi-Fi hotspots matched in accordance with a preset rule. For example, the preset rule may be strength of a Wi-Fi signal, signal strength of all matched Wi-Fi hotspots is acquired, and one Wi-Fi hotspot with the highest signal strength is determined from all the matched Wi-Fi hotspots as the determined Wi-Fi hotspot. If there are four matched Wi-Fi hotspots, i.e., A, B, C and D, and the corresponding signal strength is one bar, two bars, three bars and four bars, in the four Wi-Fi hotspots, the one with the highest signal strength is the hotspot D, and the hotspot D is used as the determined Wi-Fi hotspot. For another example, the preset rule may be the distance from the Wi-Fi hotspot to the current position, and the current position of the user is acquired, that is, the current position of the user is acquired through a positioning apparatus or a positioning system, positions of all the matched Wi-Fi hotspots are acquired, and distances between the user and respective matched Wi-Fi hotspots are calculated according to the current position and the acquired positions. The Wi-Fi hotspot with the shortest distance is determined as the determined Wi-Fi hotspot. If there are four matched hotspots, i.e., a, b, c and d and corresponding distances from the user are 3 m, 5 m, 6 m and 8 m, in the four Wi-Fi hotspots, the Wi-Fi hotspot with the shortest distance from the user is the hotspot a, and the hotspot a is used as the determined Wi-Fi hotspot. After the Wi-Fi hotspot is determined, safety verification information corresponding to the Wi-Fi hotspot determined in accordance with the preset rule is acquired from the application server through a wireless device corresponding to the determined Wi-Fi hotspot, safety verification is performed on the Wi-Fi hotspot determined in accordance with the preset rule according to the safety verification information, and a network is accessed after the safety verification is passed. When information of one WLAN matches the information of the pre-stored WLAN, step S11, step S12, step S13 and step S14 in FIG. 5 are performed in sequence; when information of a plurality of WLANs matches the information of the pre-stored WLAN, step S11, step S12, step S101, step S102 and step S103 in FIG. 8 are performed in sequence.

According to the embodiment of the present invention, when information of a plurality of WLANs matches the information of the pre-stored WLAN, one WLAN is determined from the plurality of matched WLANs in accordance with a preset rule, safety verification information corresponding to the WLAN determined in accordance with the preset rule is timely acquired from an application server through a wireless device corresponding to the WLAN determined in accordance with the preset rule, safety verification is performed on the WLAN determined in accordance with the preset rule according to the safety verification information, and a network is accessed after the safety verification is passed, thereby achieving an auto-selection on access to the WLAN and effectively improving efficiency of connecting to the WLAN.

Execution bodies of the methods for automatically connecting to a WLAN in the fifth to eighth embodiments may all be a mobile terminal. Furthermore, the methods may be implemented by a client application (such as a mobile phone manager) installed on a mobile device, wherein the mobile terminal may include, but is not limited to, electronic devices such as mobile phones, tablet computers and Personal Digital Assistants (PADs).

Figure 9:
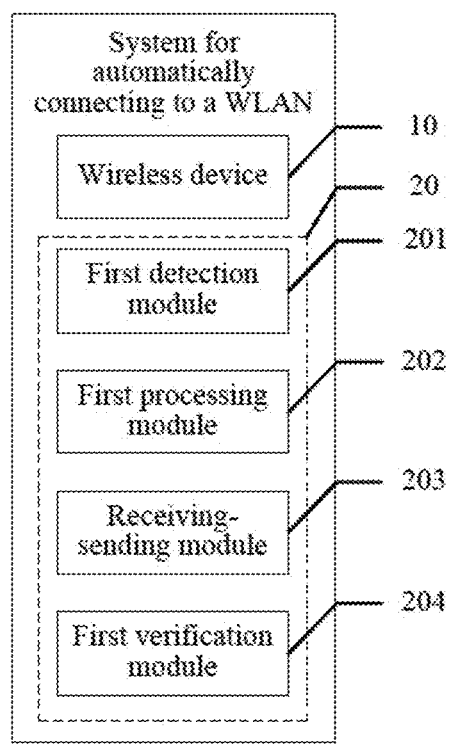
FIG. 9 is a schematic structural diagram of a first embodiment of a system for automatically connecting to a WLAN according to the present disclosure.

Further, a first embodiment of a system for automatically connecting to a WLAN according to the present disclosure is proposed. As shown in FIG. 9, the system for automatically connecting to a WLAN includes: a wireless device 100 and a terminal 200, wherein the terminal 200 includes a first detection module 201, a first processing module 202, a receiving-sending module 203 and a first verification module 204.

The first detection module 201 is configured to automatically detect whether a wireless signal of the WLAN exists when receiving a WLAN connection request triggered by a user.

When a user exchanges information with the outside, the exchange can be completed only if a network is opened. For example, when the user wants to chat with the family, he/she needs to chat with the family through a chat application (e.g., QQ, WeChat or the like) in the event that there is a network. The network may be a wired network or a wireless network, and the wireless network includes wireless networks provided by mobile communications operators or WLANs provided by Wi-Fi hotspots. The Wi-Fi hotspots may be Wi-Fi hotspots created through wireless routers, or may be Wi-Fi hotspots created through wireless devices having wireless network cards such as notebooks or Ipads. When the user wants to exchange information with the outside based on a wireless network, the user triggers access to an application by clicking an icon of the application loaded to the terminal, or triggers access to an application by opening an interface of a program running in the background and clicking an icon of the application running in the background, and triggers a Wi-Fi hotspot connection request while access to the application is triggered, and may also trigger the Wi-Fi hotspot connection request through a virtual key set in an interactive interface of the application; similarly, the Wi-Fi hotspot connection request may also be triggered according to other feasible manners. In this embodiment, the Wi-Fi hotspot connection request is preferably triggered through an application. The application may be a mobile phone manager, a QQ manager or the like.

When it is necessary to connect to a WLAN provided by a Wi-Fi hotspot, a terminal user opens a Wi-Fi switch, to open a Wi-Fi function, and when receiving a Wi-Fi hotspot connection request triggered by the user, a terminal automatically detects whether a Wi-Fi signal exists.

The first processing module 202 is configured to compare information of the WLAN corresponding to the wireless signal with information of a pre-stored WLAN when detecting the wireless signal of the WLAN, safety verification information of the pre-stored WLAN being correspondingly stored in an application server.

Information of a Wi-Fi hotspot is pre-stored, and safety verification information of the pre-stored Wi-Fi hotspot is correspondingly stored in an application server. The information of the pre-stored Wi-Fi hotspot may be stored in a form of a list, and the safety verification information of the pre-stored Wi-Fi hotspot may be correspondingly stored on an application server of an application. The information of the pre-stored Wi-Fi hotspot includes, but is not limited to, Wi-Fi hotspot information of safety verification information stored on the application server, and the information of the WLAN includes, but is not limited to, an SSID of the Wi-Fi hotspot, an IP address of the Wi-Fi hotspot, a Mac address of the Wi-Fi hotspot and/or the position of the Wi-Fi hotspot and the like. When the first detection module 201 detects the Wi-Fi signal, the first processing module 202 compares the information of the Wi-Fi hotspot corresponding to the Wi-Fi signal with the information of the pre-stored Wi-Fi hotspot. For example, an SSID corresponding to the Wi-Fi signal is acquired, and the SSID is compared with a pre-stored SSID; for another example, a Mac address corresponding to the Wi-Fi signal is acquired, and the Mac address is compared with a pre-stored Mac address.

The receiving-sending module 203 is configured to send a safety verification information acquisition request to a wireless device corresponding to the WLAN when the information of the WLAN matches the information of the pre-stored WLAN, the safety verification information acquisition request including application server information.

When the information of the Wi-Fi hotspot matches the information of the pre-stored Wi-Fi hotspot, for example, when the SSID of the Wi-Fi hotspot is identical with the SSID of the pre-stored Wi-Fi hotspot, or when the Mac address of the Wi-Fi hotspot is identical with the Mac address of the pre-stored Wi-Fi hotspot, the first processing module 202 judges that the information of the Wi-Fi hotspot matches the information of the pre-stored Wi-Fi hotspot, that is, safety verification information of the Wi-Fi hotspot is stored in the application server, the receiving-sending module 203 sends a safety verification information acquisition request to a wireless device corresponding to the wireless signal, the safety verification information acquisition request including application server information, for example, the request may include ID of the application server and other information. When the information of the Wi-Fi hotspot does not match the information of the pre-stored Wi-Fi hotspot, the user is prompted that automatic connection to the Wi-Fi hotspot fails. By judging, by the first processing module 202, whether the detected information of the Wi-Fi hotspot matches the information of the pre-stored Wi-Fi hotspot, the receiving-sending module 203 sends a safety verification information acquisition request to a wireless device corresponding to the wireless signal only when they match each other, and does not send a safety verification information acquisition request to the wireless device corresponding to the wireless signal when they do not match each other, which effectively prevents still sending a safety verification information acquisition request to the wireless device when there is no safety verification information, further reduces procedures of connection to the WLAN, and improves efficiency and accuracy of connection to the WLAN.

The wireless device 10 is configured to acquire safety verification information corresponding to the WLAN from an application server corresponding to the safety verification information acquisition request when receiving the safety verification information acquisition request, and send the safety verification information to the terminal.

When receiving the safety verification information acquisition request, the wireless device 10 determines an application server corresponding to the safety verification information acquisition request, and the determination can be made according to an application server ID included in the safety verification information acquisition request. For example, when it is determined that an application triggering a request for automatically connecting to a WLAN included in the safety verification information acquisition request is a terminal manager, it is determined that an application server corresponding to the safety verification information acquisition request is a terminal manager application server. The wireless device 10 acquires safety verification information corresponding to the WLAN from the application server corresponding to the safety verification information acquisition request, for example, acquires the safety verification information from the terminal manager application server. The wireless device 10, when receiving the safety verification information sent by the application server, sends the safety verification information to the terminal. The safety verification information may be encrypted passwords. It may be understood that the safety verification information may be transmitted in a manner of a ciphertext, so as to improve security of transmission of the safety verification information.

In another embodiment of the present invention, the process of acquiring safety verification information may also be as follows: the receiving-sending module 203 sends the safety verification information acquisition request to a wireless device corresponding to the wireless Wi-Fi hotspot, and the wireless device 10 creates a communication connection between the terminal and the application server, that is, the wireless device 10 forwards the safety verification information acquisition request to the application server when receiving the safety verification information acquisition request, the safety verification information acquisition request including information of the Wi-Fi hotspot. When receiving the safety verification information acquisition request, the application server acquires the information of the Wi-Fi hotspot, the application server acquires safety verification information corresponding to the Wi-Fi hotspot according to a mapping relationship between Wi-Fi hotspots and safety verification information, and sends the safety verification information to the wireless device 10, and the wireless device 10 returns response information based on the acquisition request, the response information including the safety verification information. When receiving the response information returned by the wireless device based on the safety verification information, the first processing module 202 acquires the safety verification information in the response information.

The first verification module 204 is configured to perform safety verification on the WLAN according to the safety verification information, and access a network after the safety verification is passed.

After the safety verification information is acquired from the application server through the wireless device, the first verification module 204 performs safety verification on the Wi-Fi hotspot according to the safety verification information, and accesses a network after the safety verification is passed. The process of performing, by the first verification module 204, safety verification on the Wi-Fi hotspot according to the safety verification information may be as follows: the first verification module 204 decrypts the safety verification information to obtain the decrypted safety verification information, and automatically fills the decrypted safety verification information in a safety verification interface provided by the Wi-Fi hotspot, to perform safety verification on the Wi-Fi hotspot. After the terminal passes the safety verification, the wireless device corresponding to the Wi-Fi hotspot authorizes the terminal to access a network. After the terminal accesses the network, the terminal can exchange information with the outside through the network.

It may be understood that, after the safety verification on the Wi-Fi hotspot is passed, the processing module 202 maps and stores the safety verification information and the Wi-Fi hotspot, to allow the first verification module 204 to pass the safety verification on the Wi-Fi hotspot directly through the stored safety verification information when the Wi-Fi hotspot is searched next time. In another embodiment of the present invention, in order to save storage space, when the processing module 202 maps and stores the safety verification information and the Wi-Fi hotspot, timing begins, within preset time (7 days, 15 days or a month, etc.), if the user does not acquire that the stored safety verification information passes safety verification, the first processing module 202 deletes the safety verification information; within the preset time, if the user acquires that the stored safety verification information passes safety verification, the first processing module 202 reserves the safety verification information. That is to say, when the number of times the processing module 202 acquires the stored safety verification information does not exceed a threshold (twice, three times, etc.), the stored safety verification information is deleted; when the number of times the processing module 202 acquires the stored safety verification information exceeds the threshold, the safety verification information is reserved.

It may be understood that, in order to further save the process of connecting to a Wi-Fi hotspot and improve efficiency of connecting to a Wi-Fi hotspot, when a Wi-Fi signal of the Wi-Fi hotspot is detected, when information of the Wi-Fi hotspot matches information of a pre-stored Wi-Fi hotspot, and when information of only one Wi-Fi hotspot matches the information of the pre-stored Wi-Fi hotspot, the first processing module 202 judges whether safety verification information of the Wi-Fi hotspot is stored, when the safety verification information of the Wi-Fi hotspot is stored, the first verification module 204 performs safety verification on the Wi-Fi hotspot directly through the stored safety verification information, and a network is accessed after the safety verification is passed. When Wi-Fi signals of a plurality of Wi-Fi hotspots are detected, the first processing module 202 judges whether safety verification information is stored in the plurality of Wi-Fi hotspots, when there is a Wi-Fi hotspot storing the safety verification information, the first verification module 204 performs safety verification on the Wi-Fi hotspot directly through the stored safety verification information, and a network is accessed after the safety verification is passed; alternatively, when safety verification information of a plurality of matched Wi-Fi hotspots stored exists, the safety verification information is displayed in a form of a list, when response information sent based on the list is received, the first processing module 202 acquires information of the Wi-Fi hotspots in the response information, and determines safety verification information of the Wi-Fi hotspots in the response information, the first verification module 204 performs safety verification on the Wi-Fi hotspots through the determined safety verification information, and the Internet is accessed after the safety verification is passed; alternatively, one Wi-Fi hotspot is determined in accordance with a preset rule (Wi-Fi signal strength, a distance from the Wi-Fi hotspot to the current position of the user, etc.), and safety verification is passed through safety verification information of the determined Wi-Fi hotspot. When a Wi-Fi signal of the Wi-Fi hotspot is detected, whether safety verification has been performed on the Wi-Fi hotspot is judged, when the safety verification has been performed on the Wi-Fi hotspot, the safety verification on the Wi-Fi hotspot is passed directly through safety verification information of the Wi-Fi hotspot stored, which saves the process of connecting to the Wi-Fi hotspot and improves efficiency of connecting to the Wi-Fi hotspot.

According to the embodiment of the present invention, by automatically detecting a wireless signal of a WLAN, sending an acquisition request to a wireless device corresponding to the wireless signal, acquiring safety verification information of the WLAN corresponding to the wireless signal from an application server corresponding to the safety verification information acquisition request through the wireless device, performing safety verification on the WLAN according to the safety verification information, and accessing a network after the safety verification is passed, achieves automatic connection to the WLAN, achieves automation of a WLAN connection manner, reduces the operation process, and improves efficiency of connecting to the WLAN.

Figure 10:
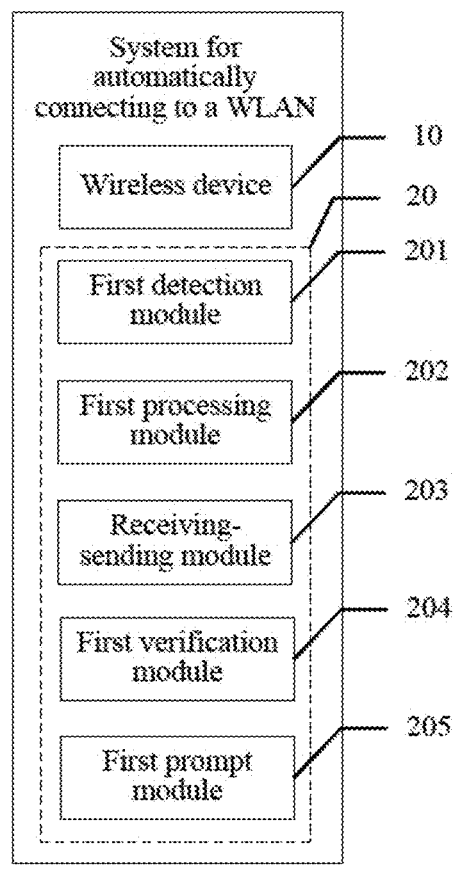
FIG. 10 is a schematic structural diagram of a second embodiment of the system for automatically connecting to a WLAN according to the present disclosure.

Further, based on the first embodiment of the system for automatically connecting to a WLAN, a second embodiment of the system for automatically connecting to a WLAN according to the present disclosure is proposed. As shown in FIG. 10, the terminal further includes: a first prompt module 205.

The first prompt module 205 is configured to, when not detecting the wireless signal of the WLAN, prompt, by the terminal, the user that the wireless signal of the WLAN is not detected, and prompt the user to move to a position where the wireless signal of the WLAN exists.

When a Wi-Fi signal is not detected, the first prompt module 205 prompts the user that the Wi-Fi signal is not detected, and prompts the user to move to a position where the Wi-Fi signal exists, so as to detect the Wi-Fi signal. The manner in which the first prompt module 205 prompts the user may be a text, an image or a sound or the like. Specifically, the process of prompting the user to move to a position where the Wi-Fi signal exists is as follows: information of Wi-Fi hotspots pre-stored by the terminal includes positions of respective pre-stored Wi-Fi hotspots, and the first processing module 202 first acquires the current position of the user, and determines a position of a Wi-Fi hotspot closest to the current position from the positions of the pre-stored Wi-Fi hotspots, and the first prompt module 205 prompts the user to move to the determined position, so as to detect the Wi-Fi signal. When the wireless signal of the WLAN is not detected, the user is prompted that the wireless signal of the WLAN is not detected, and the user is prompted to move to a position where the wireless signal of the WLAN exists, so as to timely find the position where the wireless signal of the WLAN exists and timely access a network, thereby improving efficiency of connecting to the WLAN.

Figure 11:
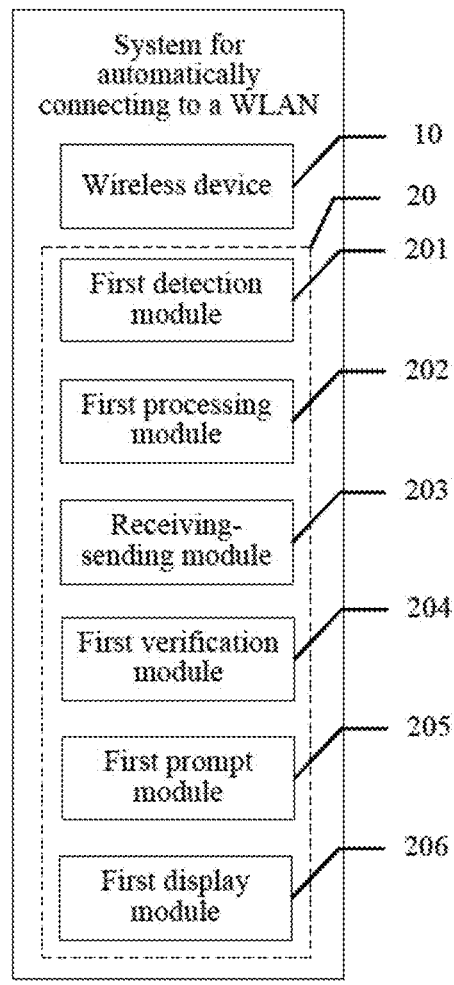
FIG. 11 is a schematic structural diagram of a third embodiment of the system for automatically connecting to a WLAN according to the present disclosure.

Further, based on the second embodiment of the system for automatically connecting to a WLAN, a third embodiment of the system for automatically connecting to a WLAN according to the present disclosure is proposed. As shown in FIG. 11, the terminal further includes: a first display module 206.

The first display module 206 is configured to, when information of a plurality of WLANs matches the information of the pre-stored WLAN, display, by the terminal, the information of the matched WLANs.

The first processing module 202 is further configured to, when trigger information based on the displayed information is received, determine a selected WLAN according to the trigger information.

The receiving-sending module 203 is further configured to send a safety verification information acquisition request to a wireless device corresponding to the selected WLAN, the safety verification information acquisition request including application server information.

The wireless device 10 is further configured to, when the safety verification information acquisition request is received, acquire safety verification information corresponding to the selected WLAN from an application server corresponding to the safety verification information acquisition request, and send the safety verification information to the terminal.

The first verification module 204 is further configured to perform safety verification on the selected WLAN according to the safety verification information, and access a network after the safety verification is passed.

When information of a plurality of Wi-Fi hotspots matches information of a pre-stored hotspot, the first display module 206 displays the information of the plurality of WLANs matched. Specifically, the first processing module 202 constructs the information of the matched Wi-Fi hotspots into a list, and the first display module 206 displays the information of the matched Wi-Fi hotspots in a form of a list. The list includes, but is not limited to, one or more of SSIDs of the Wi-Fi hotspots, Mac addresses of the Wi-Fi hotspots and IP addresses of the Wi-Fi hotspots. For example, referring to Table 1, Table 1 is a list of the information of the matched Wi-Fi hotspots, including SSIDs of the Wi-Fi hotspots. It may be understood that, in order to enable the user to timely see the list, the first display module 206, after displaying the list, prompts the user to check the list. The prompting manner may be sound, video or the like. For example, a section of voice "please select one Wi-Fi hotspot for access from the displayed list" is produced.

The user may perform a trigger response on the list by clicking an SSID in the list, when the user clicks the SSID in the list, trigger information is sent, the first processing module 202, when receiving the trigger information based on the displayed information, determines the selected Wi-Fi hotspot according to the trigger information, the receiving-sending module 203 sends a safety verification information acquisition request to a wireless device corresponding to the selected wireless signal, the wireless device 10, when receiving the safety verification information acquisition request, acquires safety verification information corresponding to the WLAN from an application server corresponding to the safety verification information acquisition request and sends the safety verification information to the terminal, and the first verification module 204 performs safety verification on the Wi-Fi hotspot according to the safety verification information, and accesses a network after the safety verification is passed. For example, when the user clicks the SSID "MacDonald", the Wi-Fi hotspot included in the trigger information is a Wi-Fi hotspot whose SSID is selected as "MacDonald", and it is determined that the user chooses to connect the Wi-Fi hotspot of "MacDonald". Safety verification information corresponding to the Wi-Fi hotspot whose SSID is "MacDonald" is acquired from the application server through the wireless device, and the safety verification information is an encrypted password. The acquired safety verification information is decrypted, and the decrypted safety verification information is automatically entered in the safety verification interface, so as to perform safety verification on the Wi-Fi hotspot whose SSID is "MacDonald", and the network is accessed after the safety verification is passed.

According to the embodiment of the present invention, when information of a plurality of WLANs matches the information of the pre-stored WLAN, the information of the matched WLANs is displayed, so as to timely acquire corresponding safety verification information from an application server through a wireless device according to trigger information based on the displayed information, safety verification is performed on the WLAN according to the safety verification information, and a network is accessed after the safety verification is passed, thereby improving efficiency of connecting to the WLAN.

Further, the first processing module 202 is further configured to, when information of a plurality of WLANs matches the information of the pre-stored WLAN, determine one WLAN from the plurality of matched WLANs in accordance with a preset rule.

The receiving-sending module 203 is further configured to send a safety verification information acquisition request to a wireless device corresponding to the determined WLAN, the safety verification information acquisition request including application server information.

The wireless device 10 is further configured to, when receiving the safety verification information acquisition request, acquire safety verification information corresponding to the WLAN determined in accordance with the preset rule from an application server corresponding to the safety verification information acquisition request, and send the safety verification information to the terminal.

The first verification module 204 is further configured to perform safety verification on the WLAN determined in accordance with the preset rule according to the safety verification information, and access a network after the safety verification is passed.

When information of a plurality of Wi-Fi hotspots matches information of a pre-stored Wi-Fi hotspot, the first processing module 202 determines one Wi-Fi hotspot from the plurality of Wi-Fi hotspots matched in accordance with a preset rule. For example, the preset rule may be strength of a Wi-Fi signal, signal strength of all matched Wi-Fi hotspots is acquired, and one Wi-Fi hotspot with the highest signal strength is determined from all the matched Wi-Fi hotspots as the determined Wi-Fi hotspot. If there are four matched Wi-Fi hotspots, i.e., A, B, C and D, and the corresponding signal strength is one bar, two bars, three bars and four bars, in the four Wi-Fi hotspots, the one with the highest signal strength is the hotspot D, and the hotspot D is used as the determined Wi-Fi hotspot. For another example, the preset rule may be the distance from the Wi-Fi hotspot to the current position, the current position of the user is acquired, that is, the current position of the user is acquired through a positioning apparatus or a positioning system, positions of all the matched Wi-Fi hotspots are acquired, and distances between the user and respective matched Wi-Fi hotspots are calculated according to the current position and the acquired positions. The Wi-Fi hotspot with the shortest distance is determined as the determined Wi-Fi hotspot. If there are four matched hotspots, i.e., a, b, c and d and corresponding distances from the user are 3 m, 5 m, 6 m and 8 m, in the four Wi-Fi hotspots, the Wi-Fi hotspot with the shortest distance from the user is the hotspot a, and the hotspot a is used as the determined Wi-Fi hotspot. The receiving-sending module 203, after determining the Wi-Fi hotspot, sends a safety verification information acquisition request to a wireless device corresponding to the determined Wi-Fi hotspot, and the wireless device 10, when receiving the safety verification information acquisition request, acquires safety verification information corresponding to the WLAN determined according to the preset rule from an application server corresponding to the safety verification information acquisition request, and sends the safety verification information to the terminal; the first verification module 204 performs safety verification on the WLAN determined in accordance with the preset rule according to the safety verification information, and accesses a network after the safety verification is passed.

According to the embodiment of the present invention, when information of a plurality of WLANs matches the information of the pre-stored WLAN, one WLAN is automatically determined from the plurality of matched WLANs in accordance with a preset rule, safety verification information corresponding to the WLAN determined in accordance with the preset rule is timely acquired from an application server through a wireless device, safety verification is performed on the WLAN determined in accordance with the preset rule according to the safety verification information, and a network is accessed after the safety verification is passed, thereby achieving an auto-selection on access to the WLAN and effectively improving efficiency of connecting to the WLAN.

Figure 12:
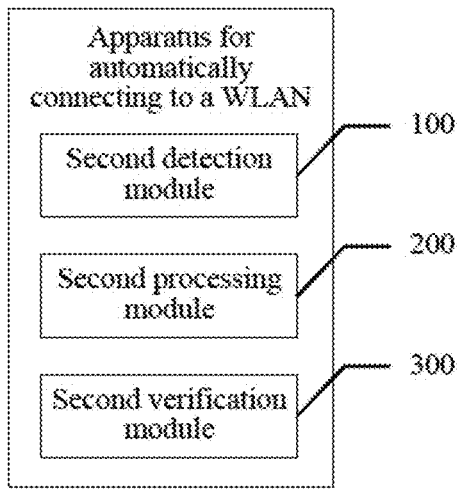
FIG. 12 is a schematic diagram of functional modules of a first embodiment of an apparatus for automatically connecting to a WLAN according to the present disclosure.

Further, a first embodiment of an apparatus for automatically connecting to a WLAN according to the present disclosure is proposed. As shown in FIG. 12, the apparatus for automatically connecting to a WLAN includes: a second detection module 100, a second processing module 200 and a second verification module 300.

The second detection module 100 is configured to automatically detect whether a wireless signal of the WLAN exists when receiving a WLAN connection request triggered by a user.

When a user exchanges information with the outside, the exchange can be completed only if a network is opened. For example, when the user wants to chat with the family, he/she needs to chat with the family through a chat application (e.g., QQ, WeChat or the like) in the event that there is a network. The network may be a wired network or a wireless network, and the wireless network includes wireless networks provided by mobile communications operators or WLANs provided by Wi-Fi hotspots. The Wi-Fi hotspots may be Wi-Fi hotspots created through wireless routers, or may be Wi-Fi hotspots created through wireless devices having wireless network cards such as notebooks or Ipads. When the user wants to exchange information with the outside based on a wireless network, the user triggers access to an application by clicking an icon of the application loaded to the terminal, or triggers access to an application by opening an interface of a program running in the background and clicking an icon of the application running in the background, and triggers a Wi-Fi hotspot connection request while access to the application is triggered, and may also trigger the Wi-Fi hotspot connection request through a virtual key set in an interactive interface of the application; similarly, the Wi-Fi hotspot connection request may also be triggered according to other feasible manners. In this embodiment, the Wi-Fi hotspot connection request is preferably triggered through an application. The application may be a mobile phone manager, a QQ manager or the like.

When it is necessary to connect to a WLAN provided by a Wi-Fi hotspot, a terminal user opens a Wi-Fi switch, to open a Wi-Fi function, and when receiving a Wi-Fi hotspot connection request triggered by the user, the second detection module 100 automatically detects whether a Wi-Fi signal exists.

The second processing module 200 is configured to compare information of the WLAN corresponding to the wireless signal with information of a pre-stored WLAN when detecting the wireless signal of the WLAN, safety verification information of the pre-stored WLAN being correspondingly stored in an application server.

Information of a Wi-Fi hotspot is pre-stored, the information of the pre-stored Wi-Fi hotspot is stored in a form of a list, and safety verification information of the pre-stored Wi-Fi hotspot may be correspondingly stored in an application server of an application platform. The information of the pre-stored Wi-Fi hotspot includes, but is not limited to, an SSID of the Wi-Fi hotspot, an IP address of the Wi-Fi hotspot, a Mac address of the Wi-Fi hotspot and/or the position of the Wi-Fi hotspot and the like. When detecting the Wi-Fi signal, the second processing module 200 compares the information of the Wi-Fi hotspot corresponding to the Wi-Fi signal with the information of the pre-stored Wi-Fi hotspot. For example, an SSID corresponding to the Wi-Fi signal is acquired, and the SSID is compared with a pre-stored SSID; for another example, a Mac address corresponding to the Wi-Fi signal is acquired, and the Mac address is compared with a pre-stored Mac address.

The second processing module 200 is further configured to, when the information of the WLAN matches the information of the pre-stored WLAN, acquire safety verification information corresponding to the WLAN from the application server through a wireless device corresponding to the WLAN.

When the information of the Wi-Fi hotspot matches the information of the pre-stored Wi-Fi hotspot, for example, when the SSID of the Wi-Fi hotspot is identical with the SSID of the pre-stored Wi-Fi hotspot, or when the Mac address of the Wi-Fi hotspot is identical with the Mac address of the pre-stored Wi-Fi hotspot, the second processing module 200 judges that the information of the Wi-Fi hotspot matches the information of the pre-stored Wi-Fi hotspot. The second processing module 200 acquires safety verification information corresponding to the Wi-Fi hotspot from an application server through a wireless device corresponding to the matched Wi-Fi hotspot. The application server is an application server corresponding to the application, for example, an application server of a QQ manager, an application server of a mobile phone manager or the like. The process of acquiring, by the second processing module 200, the safety verification information from the application server through the wireless device corresponding to the matched Wi-Fi hotspot is as follows: when the information of the Wi-Fi hotspot matches the information of the pre-stored Wi-Fi hotspot, the second processing module 200 sends the safety verification information acquisition request to a wireless device corresponding to the wireless Wi-Fi hotspot, the safety verification information acquisition request including information of the Wi-Fi hotspot and application server information, for example, the request may include ID of the application server and other information. The wireless device creates a communication connection between the terminal and the application server, that is, the wireless device forwards the safety verification information acquisition request to the application server corresponding to the safety verification information acquisition request when receiving the safety verification information acquisition request. The application server, when receiving the safety verification information acquisition request, acquires the information of the Wi-Fi hotspot, the application server acquires safety verification information corresponding to the Wi-Fi hotspot according to a mapping relationship between Wi-Fi hotspots and safety verification information, and sends the safety verification information to the wireless device, and the wireless device returns response information based on the safety verification information acquisition request, the response information including the safety verification information. When receiving the response information returned by the wireless device based on the safety verification information acquisition request, the second processing module 200 acquires the safety verification information in the response information. The safety verification information may be encrypted passwords. It may be understood that the safety verification information may be transmitted in a manner of a ciphertext, so as to improve security of transmission of the safety verification information.

The second verification module 300 is further configured to perform safety verification on the WLAN according to the safety verification information, and access the Internet after the safety verification is passed.

After acquiring the safety verification information from the application server through the wireless device, the second verification module 300 performs safety verification on the Wi-Fi hotspot according to the safety verification information, and accesses the Internet after the safety verification is passed. The process of performing, by the second verification module 300, safety verification on the Wi-Fi hotspot according to the safety verification information may be as follows: the second verification module 300 decrypts the safety verification information to obtain the decrypted safety verification information, and automatically fills the decrypted safety verification information in a safety verification interface of the Wi-Fi hotspot, to perform safety verification on the Wi-Fi hotspot. After the safety verification is passed, the wireless device corresponding to the Wi-Fi hotspot authorizes access to a network. After the network is accessed, information can be exchanged with the outside through the network accessed.

It may be understood that, after the safety verification on the Wi-Fi hotspot is passed, the second processing module 200 maps and stores safety verification information and the Wi-Fi hotspot, to cause the safety verification on the Wi-Fi hotspot to be passed directly through the stored safety verification information when the Wi-Fi hotspot is searched next time. In another embodiment of the present invention, in order to save storage space, when the second processing module 200 maps and stores the safety verification information and the Wi-Fi hotspot, timing begins, within preset time (7 days, 15 days or a month, etc.), if the user does not acquire that the stored safety verification information passes safety verification, the safety verification information is deleted; within the preset time, the second processing module 200, when acquiring that the stored safety verification information passes safety verification, reserves the safety verification information. That is to say, when the number of times the stored safety verification information is acquired does not exceed a threshold (twice, three times, etc.), the second processing module 200 deletes the stored safety verification information; when the number of times the stored safety verification information is acquired exceeds the threshold, the second processing module 200 reserves the safety verification information.

It may be understood that, in order to further save the process of connecting to a Wi-Fi hotspot and improve efficiency of connecting to a Wi-Fi hotspot, when information of the Wi-Fi hotspot matches information of a prestored Wi-Fi hotspot, and when information of only one Wi-Fi hotspot matches the information of the pre-stored Wi-Fi hotspot, the second processing module 200 judges whether safety verification information of the Wi-Fi hotspot is stored, when the safety verification information of the Wi-Fi hotspot is stored, the second verification module 300 performs safety verification on the Wi-Fi hotspot directly through the stored safety verification information, and accesses the Internet after the safety verification is passed. When information of a plurality of Wi-Fi hotspots matches information of a pre-stored Wi-Fi hotspot, the second processing module 200 judges whether safety verification information is stored in the plurality of Wi-Fi hotspots matched, when there is a Wi-Fi hotspot storing the safety verification information, the second verification module 300 performs safety verification on the Wi-Fi hotspot directly through the stored safety verification information, and accesses the Internet after the safety verification is passed; alternatively, when safety verification information of a plurality of matched Wi-Fi hotspots stored exists, the safety verification information is displayed in a form of a list, when the user sends response information based on the list, information of the Wi-Fi hotspots in the response information is acquired, safety verification information of the Wi-Fi hotspots in the response information is determined, safety verification is performed on the Wi-Fi hotspots through the determined safety verification information, and the Internet is accessed after the safety verification is passed; alternatively, the second processing module 200 determines one Wi-Fi hotspot in accordance with a preset rule (Wi-Fi signal strength, a distance from the Wi-Fi hotspot to the current position of the user, etc.), and safety verification is passed through safety verification information of the determined Wi-Fi hotspot. When information of the Wi-Fi hotspot matches the information of the pre-stored Wi-Fi hotspot, whether safety verification has been performed on the Wi-Fi hotspot is judged, when the safety verification has been performed on the Wi-Fi hotspot, the safety verification on the Wi-Fi hotspot is passed directly through safety verification information of the Wi-Fi hotspot stored, which saves the process of connecting to the Wi-Fi hotspot and improves efficiency of connecting to the Wi-Fi hotspot.

The embodiment of the present invention, by automatically detecting a wireless signal of a WLAN, acquiring safety verification information of the WLAN matching the information of the pre-stored WLAN from an application server through a wireless device corresponding to the matched WLAN, performing safety verification on the WLAN according to the safety verification information, and accessing a network after the safety verification is passed, achieves automatic connection to the WLAN, achieves automation of a WLAN connection manner, reduces the operation process, and improves efficiency of connecting to the WLAN.

Figure 13:
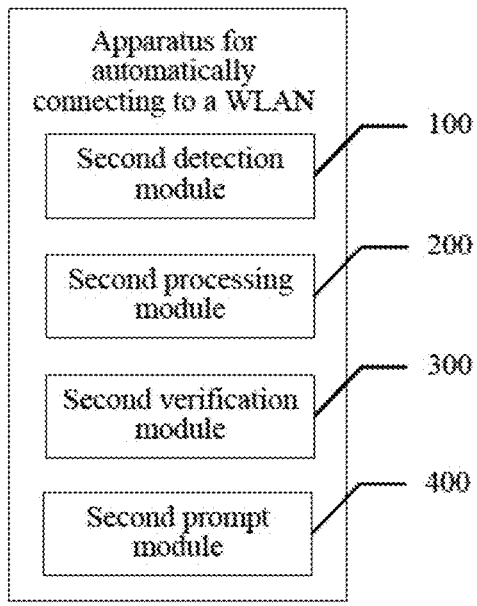
FIG. 13 is a schematic diagram of functional modules of a second embodiment of the apparatus for automatically connecting to a WLAN according to the present disclosure.

Further, a second embodiment of the apparatus for automatically connecting to a WLAN according to the present disclosure is proposed. As shown in FIG. 13, the apparatus for automatically connecting to a WLAN further includes: a second prompt module 400.

The second prompt module 400 is configured to, when not detecting the wireless signal of the WLAN, prompt the user that the wireless signal of the WLAN is not detected, and prompt the user to move to a position where the wireless signal of the WLAN exists.

When not detecting a Wi-Fi signal is not detected, the second prompt module 400 prompts the user that the Wi-Fi signal is not detected, and prompts the user to move to a position where the Wi-Fi signal exists, so as to detect the Wi-Fi signal. The manner in which the user is prompted may be a text, an image or a sound or the like. Specifically, the process of prompting the user to move to a position where the Wi-Fi signal exists is as follows: information of pre-stored Wi-Fi hotspots includes positions of respective pre-stored Wi-Fi hotspots, and the second processing module 200 acquires the current position of the user at first, determines a position of a Wi-Fi hotspot closest to the current position from the positions of the pre-stored Wi-Fi hotspots, and prompts the user to move to the determined position through the second prompt module 400, so as to detect the Wi-Fi signal. When the wireless signal of the WLAN is not detected, the user is prompted that the wireless signal of the WLAN is not detected, and the user is prompted to move to a position where the wireless signal of the WLAN exists, so as to timely find the position where the wireless signal of the WLAN exists and timely access the Internet, thereby improving efficiency of connecting to the WLAN.

Figure 14:
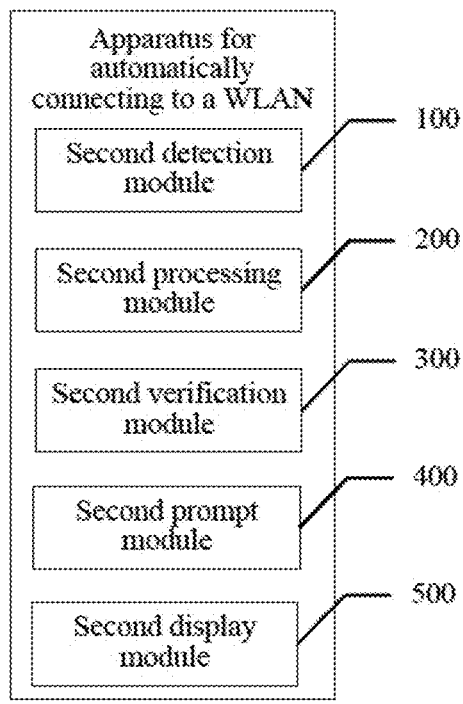
FIG. 14 is a schematic diagram of functional modules of a third embodiment of the apparatus for automatically connecting to a WLAN according to the present disclosure.

Further, a third embodiment of the apparatus for automatically connecting to a WLAN according to the present disclosure is proposed. As shown in FIG. 14, the apparatus for automatically connecting to a WLAN further includes: a second display module 500.

The second display module 500 is configured to, when information of a plurality of WLANs matches the information of the pre-stored WLAN, display the information of the matched WLANs.

The second processing module 200 is further configured to, when receiving trigger information based on the displayed information, determine a selected WLAN according to the trigger information; and acquire safety verification information corresponding to the selected WLAN from the application server through a wireless device corresponding to the selected WLAN.

The second verification module 300 is further configured to perform safety verification on the selected WLAN according to the safety verification information, and access a network after the safety verification is passed.

When information of a plurality of Wi-Fi hotspots matches information of a pre-stored hotspot, the second processing module 200 constructs the information of the matched Wi-Fi hotspots into a list, and the information of the matched Wi-Fi hotspots is displayed through the second display module 500. The second display module 500 may display the information of the matched Wi-Fi hotspots in a form of a list. The list includes, but is not limited to, one or more of SSIDs of the Wi-Fi hotspots, Mac addresses of the Wi-Fi hotspots and IP addresses of the Wi-Fi hotspots. For example, referring to Table 1, Table 1 is a list of the information of the matched Wi-Fi hotspots, including SSIDs of the Wi-Fi hotspots. It may be understood that, in order to enable the user to timely see the list, the mobile terminal, after displaying the list, prompts the user to check the list. The prompting manner may be sound, video or the like. For example, a section of voice "please select one Wi-Fi hotspot for access from the displayed list" is produced.

The user may perform a trigger response on the list by clicking an SSID in the list, when the user clicks the SSID in the list, trigger information is sent, the second processing module 200, when receiving the trigger information based on the displayed information, determines the selected Wi-Fi hotspot according to the trigger information, the second processing module 200 acquires safety verification information corresponding to the selected Wi-Fi hotspot from an application server through a wireless device corresponding the selected Wi-Fi hotspot, and the second verification module 300 performs safety verification on the Wi-Fi hotspot according to the safety verification information, and accesses a network after the safety verification is passed. For example, when the user clicks the SSID "MacDonald", the Wi-Fi hotspot included in the trigger information is a Wi-Fi hotspot whose SSID is selected as "MacDonald", and it is determined that the user chooses to connect the Wi-Fi hotspot of "MacDonald". The second processing module 200 acquires safety verification information corresponding to the Wi-Fi hotspot whose SSID is "MacDonald" is acquired from the application server through the wireless device of the Wi-Fi hotspot whose SSID is "MacDonald", and the safety verification information is an encrypted password. The second processing module 200 decrypts the acquired safety verification information, the second verification module 300 automatically enters the decrypted safety verification information in the safety verification interface, so as to perform safety verification on the Wi-Fi hotspot whose SSID is "MacDonald", and the network is accessed after the safety verification is passed.

According to the embodiment of the present invention, when information of a plurality of WLANs matches the information of the pre-stored WLAN, the information of the matched WLANs is displayed, so as to timely acquire safety verification information of a selected WLAN from an application server through a wireless device of the selected WLAN according to trigger information based on the displayed information, safety verification is performed on the WLAN according to the safety verification information, and a network is accessed after the safety verification is passed, thereby improving efficiency of connecting to the WLAN.

Further, the second processing module 200 is further configured to, when information of a plurality of WLANs matches the information of the pre-stored WLAN, determine one WLAN from the plurality of matched WLANs in accordance with a preset rule; acquire safety verification information corresponding to the WLAN determined in accordance with the preset rule from the application server through a wireless device corresponding to the WLAN determined in accordance with the preset rule; and perform safety verification on the WLAN determined in accordance with the preset rule according to the safety verification information, and access the Internet after the safety verification is passed.

When information of a plurality of Wi-Fi hotspots matches information of a pre-stored Wi-Fi hotspot, the second processing module 200 determines one Wi-Fi hotspot from the plurality of Wi-Fi hotspots matched in accordance with a preset rule. For example, the preset rule may be strength of a Wi-Fi signal, the second processing module 200 acquires signal strength of all matched Wi-Fi hotspots, and determines one Wi-Fi hotspot with the highest signal strength from all the matched Wi-Fi hotspots as the determined Wi-Fi hotspot. If there are four matched Wi-Fi hotspots, i.e., A, B, C and D, and the corresponding signal strength is one bar, two bars, three bars and four bars, in the four Wi-Fi hotspots, the one with the highest signal strength is the hotspot D, and the hotspot D is used as the determined Wi-Fi hotspot. For another example, the preset rule may be the distance from the Wi-Fi hotspot to the current position, the second processing module 200 acquires the current position of the user, that is, acquires the current position of the user through a positioning apparatus or a positioning system, positions of all the matched Wi-Fi hotspots are acquired, and distances between the user and respective matched Wi-Fi hotspots are calculated according to the current position and the acquired positions. The Wi-Fi hotspot with the shortest distance is determined as the determined Wi-Fi hotspot. If there are four matched hotspots, i.e., a, b, c and d and corresponding distances from the user are 3 m, 5 m, 6 m and 8 m, in the four Wi-Fi hotspots, the Wi-Fi hotspot with the shortest distance from the user is the hotspot a, and the hotspot a is used as the determined Wi-Fi hotspot. After determining the Wi-Fi hotspot, the second processing module 200 acquires safety verification information corresponding to the Wi-Fi hotspot determined in accordance with the preset rule from the application server through a wireless device corresponding to the determined Wi-Fi hotspot, and the second verification module 300 performs safety verification on the Wi-Fi hotspot determined in accordance with the preset rule according to the safety verification information, and accesses a network after the safety verification is passed.

According to the embodiment of the present invention, when information of a plurality of WLANs matches the information of the pre-stored WLAN, one WLAN is automatically determined from the plurality of matched WLANs in accordance with a preset rule, safety verification information corresponding to the WLAN determined in accordance with the preset rule is timely acquired from an application server through a wireless device corresponding to the WLAN determined in accordance with the preset rule, safety verification is performed on the WLAN determined in accordance with the preset rule according to the safety verification information, and a network is accessed after the safety verification is passed, thereby achieving an auto-selection on access to the WLAN and effectively improving efficiency of connecting to the WLAN.

Figure 15:
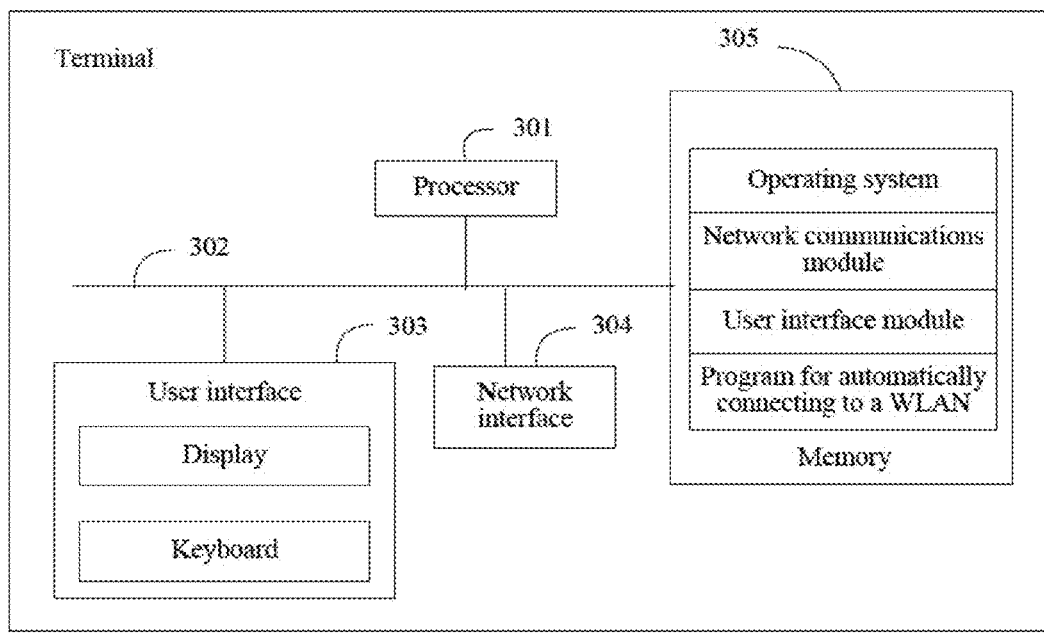
FIG. 15 is a schematic diagram of a hardware structure of a terminal where an apparatus for automatically connecting to a WLAN is located according to the present disclosure.

As shown in FIG. 15, FIG. 15 is a master diagram of a terminal where an apparatus for automatically connecting to a WLAN is located according to one embodiment of the present invention. The terminal may include: at least one processor 301, for example, CPU, at least one network interface 304, a user interface 303, a memory 305, and at least one communications bus 302. The communications bus 302 is configured to implement connection communications between the components. The user interface 303 may include a display and a keyboard, and may also include standard wired interfaces and wireless interfaces. The network interface 304 may include standard wired interfaces and wireless interfaces (e.g., wireless network interfaces). The memory 305 may be a high-speed RAM, or may be a non-volatile memory, for example, at least one disk memory. The memory 305 may also be at least one storage apparatus located away from the processor 301. The memory 305, as a computer storage medium, may include an operating system, a network communications module, a user interface module and a program for automatically connecting to a WLAN.

In the terminal where the apparatus for automatically connecting to a WLAN is located shown in FIG. 15, the network interface 304 is mainly configured to connect a server and conduct data communications with the server; the user interface 300 is mainly configured to receive a user instruction and interact with the user; and the processor 301 may be configured to call the program for automatically connecting to a WLAN stored in the memory 305, and execute the following operations:

receiving a WLAN connection request triggered by the user through the user interface 303; automatically detecting whether a wireless signal of the WLAN exists when the user interface 303 receives the connection request; comparing information of the WLAN corresponding to the wireless signal with information of a pre-stored WLAN when detecting the wireless signal of the WLAN, safety verification information of the pre-stored WLAN being correspondingly stored in an application server; when the information of the WLAN matches the information of the pre-stored WLAN, acquiring safety verification information corresponding to the WLAN from the application server through a wireless device corresponding to the WLAN; and performing safety verification on the WLAN according to the safety verification information, and accessing a network after the safety verification is passed.

In one embodiment, the processor 301 may further execute the following operations by calling the program for automatically connecting to a WLAN stored in the memory 305:

when information of a plurality of WLANs matches the information of the pre-stored WLAN, displaying the information of the matched WLANs;

when receiving trigger information based on the displayed information, determining a selected WLAN according to the trigger information;

acquiring safety verification information corresponding to the selected WLAN from the application server through a wireless device corresponding to the selected WLAN; and performing safety verification on the selected WLAN according to the safety verification information, and accessing a network after the safety verification is passed.

In one embodiment, the processor 301 may further execute the following operations by calling the program for automatically connecting to a WLAN stored in the memory 305:

when information of a plurality of WLANs matches the information of the pre-stored WLAN, determining one WLAN from the plurality of matched WLANs in accordance with a preset rule;

acquiring safety verification information corresponding to the WLAN determined in accordance with the preset rule from the application server through a wireless device corresponding to the WLAN determined in accordance with the preset rule; and performing safety verification on the WLAN determined in accordance with the preset rule according to the safety verification information, and accessing the Internet after the safety verification is passed.

In one embodiment, the processor 301 may further execute the following operations by calling the program for automatically connecting to a WLAN stored in the memory 305:

sending the safety verification information acquisition request to a wireless device corresponding to the WLAN, the safety verification information acquisition request including application server information, to allow the wireless device to acquire the safety verification information from an application server corresponding to the safety verification information acquisition request; and extracting the safety verification information in response information when receiving the response information returned by the wireless device based on the safety verification information acquisition request.

In one embodiment, the processor 301 may further execute the following operation by calling the program for automatically connecting to a WLAN stored in the memory 305:

when not detecting the wireless signal of the WLAN, prompting the user that the wireless signal of the WLAN is not detected, and prompting the user to move to a position where the wireless signal of the WLAN exists.

The terminal where the apparatus for automatically connecting to a WLAN is located described in FIG. 15 of this embodiment, by automatically detecting a wireless signal of the WLAN, acquiring safety verification information of the WLAN matching the pre-stored WLAN from an application server through a wireless device corresponding to the matched WLAN, performing safety verification on the WLAN according to the safety verification information, and accessing a network after the safety verification is passed, achieves automatic connection to the WLAN, achieves automation of a WLAN connection manner, reduces the operation process, and improves efficiency of connecting to the WLAN.

It should be noted that, herein, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the foregoing embodiments of the present invention are merely for the convenience of description, and do not imply the preference among the embodiments.

Based on the above description in the DETAILED DESCRIPTION, a person skilled in the art can clearly understand that the methods in the embodiments may be accomplished through software plus a necessary universal hardware platform, and certainly may also be accomplished through hardware, but in most cases, the former is a preferred implementation. Based on such understanding, the technical solutions of the present disclosure, in essence, or the part making contributions to the existing technology, may be embodied in the form of a software product. The computer software product is stored in a storage medium (e.g., ROM/RAM, a magnetic disk or an optical disk), and includes several instructions to cause a terminal device (which may be a mobile phone, a computer, a server or a network device, etc.) to perform the methods in the embodiments of the present invention.

The foregoing descriptions are merely preferred embodiments of the present invention, but are not intended to limit the patent scope of the present disclosure. Any equivalent structure or equivalent flow transformation made by using the specification and the content of the drawings of the present disclosure, or direct or indirect applications to other related technical field should be included in the patent protection scope of the present disclosure.

What is claimed is:

1. A method for automatically connecting to a wireless local area network (WLAN), comprising:

automatically detecting, by a terminal, whether a wireless signal of the WLAN exists when receiving a WLAN connection request triggered by a user through an application;

comparing, by the terminal, information of the WLAN corresponding to the wireless signal with information of a pre-stored WLAN when detecting the wireless signal of the WLAN, safety verification information of the pre-stored WLAN being correspondingly stored in an application server corresponding to the application;

sending, by the terminal, a safety verification information acquisition request to a wireless device corresponding to the WLAN when the information of the WLAN matches the information of the pre-stored WLAN, the safety verification information acquisition request comprising identity information of the application server;

receiving, by the terminal, safety verification information corresponding to the WLAN sent from the wireless device, wherein the safety verification information is acquired by the wireless device from the application server; and performing, by the terminal, safety verification on the WLAN according to the safety verification information, and accessing a network after the safety verification is passed.

2. The method for automatically connecting to a WLAN according to claim 1, wherein after the step of comparing, by the terminal, information of the WLAN corresponding to the wireless signal with information of a pre-stored WLAN, the method further comprises:

when information of a plurality of WLANs matches the information of the pre-stored WLAN, displaying, by the terminal, the information of the matched WLANs;

when receiving trigger information based on the displayed information, determining, by the terminal, a selected WLAN according to the trigger information;

sending, by the terminal, a safety verification information acquisition request to a wireless device corresponding to the selected WLAN, the safety verification information acquisition request comprising identity information of the application server;

receiving, by the terminal, safety verification information corresponding to the selected WLAN sent from the wireless device, wherein the safety verification information is acquired by the wireless device from the application server; and performing, by the terminal, safety verification on the selected WLAN according to the safety verification information, and accessing a network after the safety verification is passed.

3. The method for automatically connecting to a WLAN according to claim 1, wherein after the step of comparing, by the terminal, information of the WLAN corresponding to the wireless signal with information of a pre-stored WLAN, the method further comprises:

when information of a plurality of WLANs matches the information of the pre-stored WLAN, determining, by the terminal, one WLAN from the plurality of matched WLANs in accordance with a preset rule;

sending, by the terminal, a safety verification information acquisition request to a wireless device corresponding to the determined WLAN, the safety verification information acquisition request comprising identity information of the application server;

receiving, by the terminal, safety verification information corresponding to the determined WLAN sent from the wireless device, wherein the safety verification information is acquired by the wireless device from the application server; and performing, by the terminal, safety verification on the WLAN determined in accordance with the preset rule according to the safety verification information, and accessing a network after the safety verification is passed.

4. The method for automatically connecting to a WLAN according to claim 1, wherein after the step of detecting, by a terminal, whether a wireless signal of the WLAN exists, the method further comprises:

when not detecting the wireless signal of the WLAN, prompting, by the terminal, the user that the wireless signal of the WLAN is not detected, and prompting the user to move to a position where the wireless signal of the WLAN exists.

5. The method for automatically connecting to a WLAN according to claim 1, wherein after the step of receiving, by the terminal, safety verification information corresponding to the WLAN sent from the wireless device, the method further comprising:

decrypting, by the terminal, the safety verification information to obtain the decrypted safety verification information, and performing safety verification on the WLAN according to the decrypted safety verification information, wherein the safety verification information is an encrypted password.

6. A method for automatically connecting to a wireless local area network (WLAN), comprising:

automatically detecting, by a terminal, whether a wireless signal of the WLAN exists when receiving a WLAN connection request triggered by a user through an application;

comparing, by the terminal, information of the WLAN corresponding to the wireless signal with information of a pre-stored WLAN when detecting the wireless signal of the WLAN, safety verification information of the pre-stored WLAN being correspondingly stored in an application server corresponding to the application;

when the information of the WLAN matches the information of the pre-stored WLAN, acquiring, by the terminal, safety verification information corresponding to the WLAN from the application server through a wireless device corresponding to the WLAN; and performing, by the terminal, safety verification on the WLAN according to the safety verification information, and accessing a network after the safety verification is passed;

wherein the step of acquiring, by the terminal, safety verification information corresponding to the WLAN from the application server through a wireless device corresponding to the WLAN comprises:

sending, by the terminal, the safety verification information acquisition request to a wireless device corresponding to the WLAN, the safety verification information acquisition request comprising identity information of the application server;

acquiring, by the wireless device, the safety verification information from the application server; and returning response information to the terminal; and extracting, by the terminal, the safety verification information in the response information when receiving the response information returned by the wireless device.

7. The method for automatically connecting to a WLAN according to claim 6, wherein after the step of comparing, by the terminal, information of the WLAN corresponding to the wireless signal with information of a pre-stored WLAN, the method further comprises:

when information of a plurality of WLANs matches the information of the pre-stored WLAN, displaying, by the terminal, the information of the matched WLANs;

when receiving trigger information based on the displayed information, determining, by the terminal, a selected WLAN according to the trigger information;

acquiring, by the terminal, safety verification information corresponding to the selected WLAN from the application server through a wireless device corresponding to the selected WLAN; and performing, by the terminal, safety verification on the selected WLAN according to the safety verification information, and accessing a network after the safety verification is passed.

8. The method for automatically connecting to a WLAN according to claim 6, wherein after the step of comparing, by the terminal, information of the WLAN corresponding to the wireless signal with information of a pre-stored WLAN, the method further comprises:
when information of a plurality of WLANs matches the information of the pre-stored WLAN, determining by the terminal, one WLAN from the plurality of matched WLANs in accordance with a preset rule;
acquiring by the terminal, safety verification information corresponding to the WLAN determined in accordance with the preset rule from the application server through a wireless device corresponding to the WLAN determined in accordance with the preset rule; and
performing, by the terminal, safety verification on the WLAN determined in accordance with the preset rule according to the safety verification information, and accessing a network after the safety verification is passed.

9. The method for automatically connecting to a WLAN according to claim 6, wherein after the step of detecting by the terminal, whether a wireless signal of the WLAN exists, the method further comprises:
when not detecting the wireless signal of the WLAN, prompting, by the terminal, the user that the wireless signal of the WLAN is not detected, and prompting the user to move to a position where the wireless signal of the WLAN exists.

10. The method for automatically connecting to a WLAN according to claim 6, wherein after the step of acquiring, by the terminal, safety verification information corresponding to the WLAN from the application server through a wireless device corresponding to the WLAN, the method further comprising:
decrypting, by the terminal, the safety verification information to obtain the decrypted safety verification information, and performing safety verification on the WLAN according to the decrypted safety verification information, wherein the safety verification information is an encrypted password.

11. A terminal, comprising:
one or more processors; and
memory in electronic communication with the one or more processors;
instructions stored in the memory, the instructions being executable by the one or more processors to:
automatically detect whether a wireless signal of the WLAN exists when receiving a WLAN connection request triggered by a user through an application;
compare information of the WLAN corresponding to the wireless signal with information of a pre-stored WLAN when detecting the wireless signal of the WLAN, safety verification information of the pre-stored WLAN being correspondingly stored in an application server corresponding to the application;
send a safety verification information acquisition request to a wireless device corresponding to the WLAN when the information of the WLAN matches the information of the pre-stored WLAN, the safety verification information acquisition request comprising identity information of the application server;
receive safety verification information corresponding to the WLAN sent from the wireless device, wherein the safety verification information is acquired by the wireless device from the application server; and
perform safety verification on the WLAN according to the safety verification information, and access a network after the safety verification is passed.

12. The terminal according to claim 11, wherein the instructions are further executable to:
when information of a plurality of WLANs matches the information of the pre-stored WLAN, display the information of the matched WLANs;
when receiving trigger information based on the displayed information, determine a selected WLAN according to the trigger information;
send a safety verification information acquisition request to a wireless device corresponding to the selected WLAN, the safety verification information acquisition request comprising identity information of the application server;
receive safety verification information corresponding to the selected WLAN sent from the wireless device, wherein the safety verification information is acquired by the wireless device from the application server; and
perform safety verification on the selected WLAN according to the safety verification information, and access a network after the safety verification is passed.

13. The terminal according to claim 11, wherein the instructions are further executable to:
when information of a plurality of WLANs matches the information of the pre-stored WLAN, determine one WLAN from the plurality of matched WLANs in accordance with a preset rule;
send a safety verification information acquisition request to a wireless device corresponding to the determined WLAN, the safety verification information acquisition request comprising identity information of the application server;
receive safety verification information corresponding to the determined WLAN sent from the wireless device, wherein the safety verification information is acquired by the wireless device from the application server; and
perform safety verification on the WLAN determined in accordance with the preset rule according to the safety verification information, and access a network after the safety verification is passed.

14. The terminal according to claim 11, wherein the instructions are further executable to
when not detecting the wireless signal of the WLAN, prompt the user that the wireless signal of the WLAN is not detected, and prompt the user to move to a position where the wireless signal of the WLAN exists.

15. The terminal according to claim 11, wherein the instructions are further executable to:
decrypting the safety verification information to obtain the decrypted safety verification information, and performing safety verification on the WLAN according to the decrypted safety verification information, wherein the safety verification information is an encrypted password.

16. A non-transitory computer-readable storage medium having stored therein instructions that, when executed by a processor of a terminal, causes the terminal to perform a method for automatically connecting to a wireless local area network (WLAN), the method comprising:
automatically detecting whether a wireless signal of the WLAN exists when receiving a WLAN connection request triggered by a user through an application;

comparing information of the WLAN corresponding to the wireless signal with information of a pre-stored WLAN when detecting the wireless signal of the WLAN, safety verification information of the pre-stored WLAN being correspondingly stored in an application server corresponding to the application;

sending a safety verification information acquisition request to a wireless device corresponding to the WLAN when the information of the WLAN matches the information of the pre-stored WLAN, the safety verification information acquisition request comprising identity information of the application server;

receiving safety verification information corresponding to the WLAN sent from the wireless device, wherein the safety verification information is acquired by the wireless device from the application server; and performing safety verification on the WLAN according to the safety verification information, and accessing a network after the safety verification is passed.

17. The non-transitory computer-readable storage medium according to claim 16, wherein the instruction, when executed by a processor of a terminal, causes the terminal to perform a method for automatically connecting to a wireless local area network (WLAN), the method further comprising:

decrypting the safety verification information to obtain the decrypted safety verification information, and performing safety verification on the WLAN according to the decrypted safety verification information, wherein the safety verification information is an encrypted password.

* * * * *